United States Patent
Howland

(10) Patent No.: US 11,141,966 B2
(45) Date of Patent: Oct. 12, 2021

(54) METHOD OF LAMINATING A PERFORMANCE-ENHANCING LAYER TO A SEAMLESS THREE DIMENSIONAL GLOVE

(71) Applicant: Warwick Mills Inc., New Ipswich, NH (US)

(72) Inventor: Charles A Howland, Temple, NH (US)

(73) Assignee: Warwick Mills, Inc., New Ipswich, NH (US)

( * ) Notice: Subject to any disclaimer, the term of this patent is extended or adjusted under 35 U.S.C. 154(b) by 676 days.

(21) Appl. No.: 15/878,960

(22) Filed: Jan. 24, 2018

(65) Prior Publication Data

US 2018/0154622 A1    Jun. 7, 2018

Related U.S. Application Data

(63) Continuation-in-part of application No. 13/949,279, filed on Jul. 24, 2013, now abandoned.
(Continued)

(51) Int. Cl.
  *B32B 37/10* (2006.01)
  *A41D 19/00* (2006.01)
  (Continued)

(52) U.S. Cl.
  CPC ...... *B32B 37/1018* (2013.01); *A41D 19/0006* (2013.01); *A41D 19/0051* (2013.01);
  (Continued)

(58) Field of Classification Search
  CPC ............ B32B 37/1019; B32B 37/1018; A41D 19/0006; A41D 19/051
  (Continued)

(56) References Cited

U.S. PATENT DOCUMENTS

| | | | |
|---|---|---|---|
| 3,515,625 | A | 6/1970 | Sedlak et al. |
| 4,881,951 | A | 11/1989 | Wood et al. |

(Continued)

FOREIGN PATENT DOCUMENTS

| | | | |
|---|---|---|---|
| CA | 2404364 A1 | 10/2001 | |
| CA | 2580341 A1 | 4/2006 | |

(Continued)

OTHER PUBLICATIONS

PCT Search Report and Written Opinion for PCT Application No. PCT/US2013/051760, dated Nov. 5, 2013, 9 pages.
(Continued)

*Primary Examiner* — Alissa J Tompkins
*Assistant Examiner* — Catherine M Ferreira
(74) *Attorney, Agent, or Firm* — Maine Cernota & Rardin

(57) ABSTRACT

A method of manufacturing an enhanced, 3D, hand-shaped glove includes placing a seamless textile glove shell onto a laminating form, placing a solid laminate preform onto the glove shell, and applying pressure at an elevated temperature to laminate the preform to the glove shell. A platen or roller press can apply pressure to a glove shell on a flat surface of a laminating form, or a bladder or vacuum bag press can apply pressure to a glove shell on a curved surface of a laminating form. Edge peel resistance can be enhanced by extending the perimeter of a low modulus upper preform layer beyond underlying layers and bonding it directly to the glove shell. Fingers of the laminating form can be made wide and thin to cause warping of the preform about the glove fingers, or narrow and thick to minimize distortion of the finger shapes due to the preform.

22 Claims, 19 Drawing Sheets

Related U.S. Application Data

(60) Provisional application No. 61/676,021, filed on Jul. 26, 2012.

(51) Int. Cl.

| | | |
|---|---|---|
| *A41D 19/015* | (2006.01) | |
| *B32B 37/12* | (2006.01) | |
| *B32B 1/00* | (2006.01) | |
| *B32B 25/08* | (2006.01) | |
| *B32B 25/10* | (2006.01) | |
| *B32B 25/14* | (2006.01) | |
| *B32B 5/02* | (2006.01) | |
| *B32B 37/18* | (2006.01) | |
| *A41D 19/04* | (2006.01) | |

(52) U.S. Cl.
CPC ....... *A41D 19/0065* (2013.01); *A41D 19/015* (2013.01); *A41D 19/01558* (2013.01); *B32B 1/00* (2013.01); *B32B 5/026* (2013.01); *B32B 25/08* (2013.01); *B32B 25/10* (2013.01); *B32B 25/14* (2013.01); *B32B 37/12* (2013.01); *B32B 37/182* (2013.01); *A41D 19/04* (2013.01); *A41D 2400/80* (2013.01); *A41D 2500/10* (2013.01); *A41D 2500/20* (2013.01); *A41D 2600/20* (2013.01); *B32B 37/1009* (2013.01); *B32B 2037/1253* (2013.01); *B32B 2262/0269* (2013.01); *B32B 2307/744* (2013.01); *B32B 2437/02* (2013.01)

(58) Field of Classification Search
USPC ......................................................... 2/161.6
See application file for complete search history.

(56) References Cited

U.S. PATENT DOCUMENTS

| | | | |
|---|---|---|---|
| 5,498,649 | A | 3/1996 | Guillot |
| 5,558,906 | A | 9/1996 | Albrinck et al. |
| 5,766,400 | A | 6/1998 | Gallagher, Jr. |
| 5,962,108 | A | 10/1999 | Nestgard et al. |
| 6,203,874 | B1 * | 3/2001 | Nagafuchi ................ B32B 5/18 428/41.8 |
| 7,007,308 | B1 | 3/2006 | Howland et al. |
| 7,469,427 | B2 * | 12/2008 | Yang ................... A41D 19/0006 2/161.6 |
| 2005/0221073 | A1 | 10/2005 | Liou |
| 2006/0009104 | A1 | 1/2006 | Schneider et al. |
| 2006/0143767 | A1 * | 7/2006 | Yang ....................... B32B 5/022 2/16 |
| 2007/0083980 | A1 | 4/2007 | Yang et al. |
| 2008/0160301 | A1 | 7/2008 | Nandi et al. |
| 2008/0299341 | A1 | 12/2008 | Renaud et al. |
| 2009/0139011 | A1 * | 6/2009 | VanErmen ....... A41D 19/01505 2/161.8 |
| 2009/0183298 | A1 | 7/2009 | Baacke et al. |
| 2010/0011484 | A1 | 1/2010 | Williams |
| 2012/0124931 | A1 * | 5/2012 | Carbary ................. C09J 183/04 52/411 |

FOREIGN PATENT DOCUMENTS

| | | |
|---|---|---|
| CA | 2719551 A1 | 6/2009 |
| CA | 2813149 A1 | 4/2012 |
| JP | 05331299 A | 12/1993 |
| JP | 3472354 B2 | 12/2003 |
| JP | 2008214794 A | 9/2008 |
| WO | 9531593 A1 | 11/1995 |
| WO | 9747212 A1 | 12/1997 |
| WO | 9936606 A1 | 7/1999 |
| WO | 0174186 A2 | 10/2001 |
| WO | 2006044535 A1 | 4/2006 |
| WO | 2006078398 A1 | 7/2006 |
| WO | 2006095375 A2 | 9/2006 |
| WO | 2009070789 A1 | 6/2009 |

OTHER PUBLICATIONS

Supplementary European Search Report for European Application No. EP13822812, dated Dec. 3, 2015, 9 pages.
International Search Report and Written Opinion of Application No. PCTUS216/036997 dated Sep. 20, 2016, 17 pages.
Canadian Office Action for Appl No. 2878234 dated Jun. 6, 2019, 6 pages.

\* cited by examiner

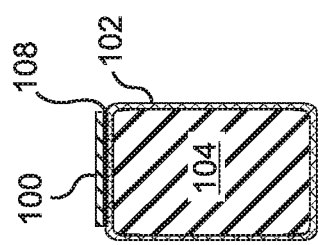 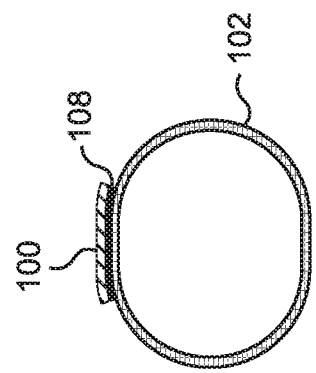
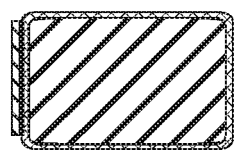 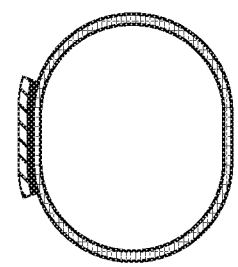
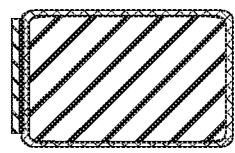 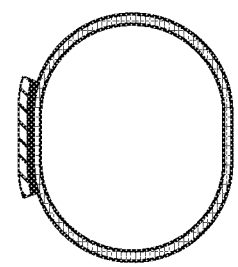
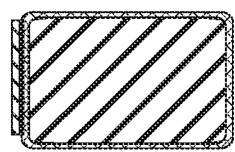 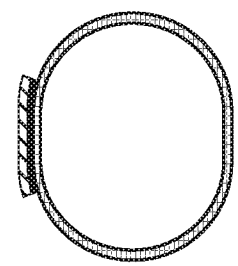
Figure 8C
Figure 8D

METHOD OF LAMINATING A PERFORMANCE-ENHANCING LAYER TO A SEAMLESS THREE DIMENSIONAL GLOVE

RELATED APPLICATIONS

This application is a continuation in part of U.S. application Ser. No. 13/949,279, which was filed on Jul. 24, 2013. U.S. application Ser. No. 13/949,279 claims the benefit of U.S. Provisional Application 61/676,021, which was filed Jul. 26, 2012. Both of these applications are herein incorporated by reference in their entirety for all purposes.

FIELD OF THE INVENTION

The invention relates to protective gloves, and more particularly, to three dimensional seamless gloves that closely approximate the shape of a human hand and include at least one performance-enhancing layer applied to an underlying glove shell.

BACKGROUND OF THE INVENTION

Protective gloves are used for a wide variety of household, industrial, and medical applications. Accordingly, gloves are made according to many different methods and from many different materials, depending on the intended application, the quantity to be produced, and the desired manufacturing cost.

There are four principle methods for manufacturing gloves. Some gloves are created by bonding flat sheets of elastomeric films and/or nonwoven materials to each other to form flat 2D gloves. Others are sewn from textile rolls and/or flat leather panels into gloves that roughly approximate the shape of a hand. Still others, for example latex gloves, are formed by dipping hand shaped forms into elastomeric coating liquids, thereby forming elastomeric gloves that closely approximate the shape of a hand. And yet others are knit by specialized glove knitting machines into 3D gloves that closely approximate the shape of a hand. While gloves that include seams and only roughly approximate the shape of a hand are often cheaper to manufacture, the complex shape and movement of the hand favors the use of 3D gloves that closely conform to the true shape of a hand for comfort, grip, and dexterity.

It should be noted that, in a sense, all gloves are three dimensional. Nevertheless, the term "3D" glove is used herein strictly to refer to seamless textile gloves that are knit or woven in a 3D shape that closely approximate the shape of a human hand. Gloves that are formed by providing two, essentially flat pieces and sewing or bonding them together with a seam about their perimeters are referred to herein as "2D" gloves, regardless of the shape of the resulting glove. Gloves that are formed by a dipping process are referred to as "dipped" gloves.

It is sometimes desirable to apply one or more added materials onto a glove that enhance its performance in one way or another. For example, it may be desirable to apply an elastomeric material onto the palm and inner finger surfaces, so as to increase friction in those areas and enhance the glove's gripping properties. Or it may be desirable to add a material such as para-aramid to the glove to increase its strength and cut resistance. The addition of enhancing materials and/or fillers may be desired due to their resistance to penetration by sharp objects, such as rose thorns or hypodermic needles.

One approach is to prepare glove materials themselves such that they intrinsically include the desired features, possibly including filled and/or laminated layers, and then to manufacture the glove from the prepared materials. However, manufacturing a glove from such materials typically requires specialized equipment and methods, especially if the glove is to be formed into a shape that closely approximates the shape of a hand. The cost can be prohibitive, and the flexibility, thermal properties, and/or moisture vapor penetration properties of the resulting glove may be unacceptable. In addition, this approach typically requires that either half of the glove or the entire glove be manufactured from the specially prepared material, so that there is limited freedom to apply the enhancing materials only where they are needed on the glove. In addition, this "pre-enhanced glove materials" approach is not applicable to the fabrication of 3D seamless textile glove shells, where the glove is knitted or woven from yarn directly, and there is no step of glove assembly.

For many applications, it is therefore desirable to add one or more performance-enhancing layers to a pre-manufactured glove shell. For example, a glove shell may be manufactured from cotton, nylon, PET, or from some other suitable material that is relatively easy to knit, dip, or otherwise form in an accurate hand shape according to cost-effective methods well known in the art. A grip-enhancing layer and/or an anti-penetration layer can then be added to the palm and/or inner finger surfaces so as to enhance the grip and/or increase the protective qualities of the glove. By adding similar layers to the back of the shell, the entire glove can be covered by enhancing materials if so desired.

A performance-enhancing layer can be sewn onto any desired region of a glove shell, but this is a labor-intensive step, especially if the 3D shape of the glove shell is to be maintained. Another approach is to partially or fully dip the glove shell into a coating liquid, whereby the accurate 3D hand shape of the glove shell is preserved. In this approach, the basic dipping process used for making latex gloves is adapted slightly. The sewn or knit glove shell is mounted on a hand-shaped dipping form, and then the form and shell are dipped together so as to coat some or all of the glove shell surface with the enhancing material.

However, there are many limitations that apply to dipping as a method for applying performance-enhancing layers to a 3D glove shell. For example, this approach severely limits the freedom to apply the enhancing materials only where they are needed on the glove. Furthermore, dipping cannot be used to apply highly filler-loaded elastomers, textile layers or oriented films. Dipping also cannot be used to apply printed graphics to the glove. In addition, dipping tends to provide a relatively thick coating that significantly reduces the flexibility of the glove.

The physical limitations regarding filler-loaded elastomer layers applied by dipping of 3D gloves can be understood as follows. Obviously, any coating material applied by dipping must be in a liquid state when the glove shell is dipped. The viscosity of the liquid coating material must be low enough to permit immersion of the form and glove shell into the coating material, and to permit excess coating material to subsequently flow away from the dipped shell by gravity and/or by acceleration of the dipping form. Blades and other types of coating control tooling are incompatible with dipping of a 3D glove. As a result, dipping viscosities must typically be within a range of about 1-10K centipoise. This viscosity range precludes the use of highly concentrated or highly dense fillers, since either the viscosity of the coating material will be increased by the filler to an unacceptable level, or too much of the filler will settle in the dip tank and will not be applied to the glove.

Another approach is to attach a performance-enhancing layer to the finger and/or palm region of a 3D glove using an adhesive that cures, for example, due to solvent evaporation and/or chemical reaction. Typically, such adhesives have a low viscosity before curing, so that they can flow freely into the glove fabric, and require very little handling beyond application of the adhesive and placement of the pre-formed layer onto the desired region of the glove.

However, soft, flexible gloves are typically desired, and the stiffness of a knit glove tends to increase as increasing amounts of adhesive penetrate into the textile of the glove shell. Furthermore, if there is significant penetration of the adhesive into the fabric of a 3D textile glove shell, there is a risk that the adhesive will enter the underlying layer of the glove shell and adhere the top and bottom of the glove shell to each other. For this reason, it can be advantageous to laminate a pre-formed enhancing layer onto a textile glove shell using an adhesive that is of high viscosity and requires application of pressure at an elevated temperature, thereby minimizing penetration of the adhesive into the glove shell fabric. For example, a thin film thermoplastic adhesive can minimize penetration of the adhesive into the glove shell fabric, and thereby mitigate many of the problems associated with applying an adhesive to a textile glove. However, this approach can be problematic when applying an enhancing layer to a glove shell that closely approximates the shape of a human hand, such as a seamless 3D glove shell.

U.S. Pat. No. 7,007,308, also by the present inventor, and included herein by reference for all purposes, describes a method for applying performance-enhancing layers to the inner and/or outer palm, back, and finger surfaces of one or both panels of a 2D glove before glove assembly. According to this approach, a flat, solid layer of a material having the desired properties is attached to a 2D glove panel by a lamination adhesive that requires application of pressure at an elevated temperature, such as a layer of thermoplastic film. Use of a lamination adhesive to attach the enhancing layer to the glove shell reduces the labor and manufacturing cost as compared to sewing. Use of an enhancing material that is prepared, cut, and preformed as a solid layer before it is applied to the glove shell allows the performance-enhancing material to include multiple layers of different substances, including fillers of any density.

U.S. Pat. No. 7,007,308 teaches how to laminate preforms onto panels of a flat, 2D glove shell before glove assembly. Under these conditions, the application of pressure at elevated temperature is simplified, and there is no risk of adhering the front and back panels of the glove shell to each other, because the lamination precedes assembly together of the glove panels. However, U.S. Pat. No. 7,007,308 is silent regarding lamination of a solid, preformed enhancement layer to a textile glove shell that is already assembled or is knit or woven as a complete glove having a shape that closely approximates the shape of a human hand, such as a seamless, 3D glove shell. In addition, U.S. Pat. No. 7,007,308 is silent regarding features and methods that reduce the likelihood that edges of the applied enhancing layer will peel away from the shell.

What is needed, therefore, is a method for laminating a performance-enhancing layer to the palm, back, and/or finger regions of a textile glove having a shape that closely approximates the shape of a human hand, wherein the glove includes a hand-shaped glove shell, and the lamination adhesive requires application of pressure at an elevated temperature.

SUMMARY OF THE INVENTION

The present invention is a method for laminating a performance-enhancing layer to the palm, back, and/or finger regions of a glove having a shape that closely approximates the shape of a human hand, wherein the glove includes a hand-shaped glove shell, and the lamination adhesive requires application of pressure at an elevated temperature. In embodiments, the glove shell is a seamless, 3D glove shell.

The method of the present invention includes preparing a solid, thin, flat, performance-enhancing layer, referred to herein as the "laminate preform," or simply as the "laminate." The laminate preform includes a laminating adhesive on one of its outer surfaces that requires application of pressure at an elevated temperature. The glove shell is placed on a 3D laminating form that provides a smooth, wrinkle-free laminating surface. The laminate preform is then placed on the glove shell above the laminating surface, with the layer of laminating adhesive in contact with the glove shell, and pressure is applied at an elevated temperature so as to adhesively attach the laminate preform layer to the glove shell.

In embodiments, the 3D laminating form includes opposing flat surfaces, and the laminating pressure is applied to the assembled 3D glove shell and laminate preform by a platen press, a roller press, or some other type of press that is designed to apply pressure to a substantially planar surface. In some of these embodiments, the glove is stretched when placed onto the laminating form, and is configured to elastically "spring back" after lamination into a shape that closely approximates the shape of a human hand.

In other embodiments, the glove is placed onto a 3D laminating form that is curved or otherwise shaped to match the shape of the glove shell, the laminate preform is placed onto the curved surface of the glove shell, the temperature is elevated, and the laminating pressure is applied to the preform by a bladder press or a vacuum bag press.

According to either of these two approaches, the adhesion process can include any combination of process features and variables that are known in the art of lamination, including heat, pressure and reactive adhesives. The lamination adhesive can include a thermoplastic, a pressure sensitive adhesive, and/or a reactive adhesive, so long as the adhesive requires application of pressure at an elevated temperature.

For measuring the flexibility benefits of the present invention, we have selected the ASTM D4032-08 standard test method for stiffness of fabric by the circular bend procedure. This test uses a standard 4"×8" test coupon. We have modified the method to use the palm and back of the gloves under test. After slitting the glove up one side and removing the fingers and thumb, the remaining coupon for an extra-large glove is very nearly 4 inches×8 inches. The circular bend test is sensitive to small changes in the glove and laminate system. In some cases we find that it is necessary to precondition the palm and back glove test coupons by making multiple runs on the circular bend test to reach stable conditioned values. To obtain these conditioned test values, we run the test 10 times and use the average of the results from tests 8, 9, and 10 as the stable, conditioned circular bend result.

Embodiments of the present invention include laminate preforms that are much thinner than can be achieved with dipping processes. In some embodiments, the thickness of the laminate preform is between 25 microns and 75 microns, which provides a low bending stiffness. Even in embodiments where textile inserts and textile components are used in the laminate preforms, the circular bending stiffness is much lower than what can be provided by a dipped glove, and very much lower than what is found in gloves that include multiple layers of protective textile and dipped surfaces.

In embodiments, penetration of the lamination adhesive into the glove shell is controlled, since the stiffness of the glove tends to increase as more adhesive penetrates into the textile of the glove shell, and soft, flexible gloves are typically desired. The use of non-liquid, thin film adhesives in embodiments of the present invention provides excellent adhesion and very controlled and limited penetration of the lamination adhesive into the textile glove shell. In embodiments, thin adhesive films having a thickness of between 6 and 50 microns are used, so as to provide only limited penetration of the adhesive into the fibers of the glove shell. This approach is combined in some embodiments with thin laminate preforms to maximize the circular bending performance. In embodiments, the thicknesses of the adhesive layer, or of each such layer if there is more than one adhesive film layer, is controlled to less than +/−5 microns.

In various embodiments, the glove shell is reversibly deformable, whereby it is deformed while it is on the 3D laminating form and then elastically returns to an accurate 3D hand-shape after the laminate preform is applied and the resulting glove is removed from the form. In some of these embodiments, the regions that are laminated to the preform do not fully recover from being stretched, such that the recovery after stretching is proportionately greater in the regions that are not laminated. In some of these embodiments, the shape of the laminating form is adjusted so as to take advantage of this effect.

For example, in embodiments where the laminating form includes two opposed, flat surfaces, and in cases where the laminate preform is highly flexible and it is desirable that the preform extend between the fingers, one or more of the finger portions of the laminating form can be made thinner and wider than a human finger, so that an extended region is presented for lamination e.g. on the palm side of the finger portions, after which recovery of the non-laminated side and back regions of the glove shell fingers pulls the initially flat preform into a curved shape that extends between the glove shell fingers.

In other cases, for example where the laminate preform is relatively stiff and application of the preform is desired only on inner or outer surfaces of the fingers, one or more of the finger portions of the laminating form can be made narrower and thicker than a human finger, so that relatively more of the glove finger material extends along the sides of the laminating form "fingers," and relatively less is presented in the palm and/or back regions for lamination. This approach minimizes any distortion of the shapes of the glove fingers after lamination, and increased the degree of stretch provided by the glove fingers, and the consequent comfort to the wearer, by increasing the portion of the finger circumference that is not laminated.

In embodiments, the performance-enhancing feature provided by the laminate that cannot be provided by dipping is an oriented film, a highly filler-loaded elastomer, a fabric layer, and/or printed graphics. In some embodiments, preparation of the laminate preform includes printing, roll to roll coating, extrusion, stenting, blown extrusion, weaving, and/or knitting.

As discussed above, a primary method in the prior art for applying coating layers to gloves is dipping. Gloves are dipped for a number of reasons. The most important are:

Coatings create a barrier film on the glove that protects the wearer;

Coatings have higher coefficients of friction than textiles, so they improve the grip of the glove; and Coatings have higher abrasion resistance than textiles and improve the durability of the glove.

In embodiments, the laminate preforms of the present invention offer the same benefits. However, the materials and processing options enabled by the present invention can deliver these benefits selectively to targeted areas of the glove, and with much lower impact on the stiffness of the glove.

Note that the present invention is highly suitable for combination with the teachings of U.S. Pat. No. 7,007,308, also by the present inventor.

The present invention is a method of manufacturing a glove having a three-dimensional shape that closely approximates the shape of a human hand, the glove including a solid laminate preform attached by a lamination adhesive to a lamination region of an underlying glove shell. The method includes providing a textile glove shell having a lamination region extending onto at least one of a palm, back, and finger region of the glove shell, preparing a solid laminate preform, the laminate preform including an exposed layer of lamination adhesive, providing a laminating form having a hand-shaped region, the hand-shaped region including a smooth laminating surface, placing the glove shell onto the laminating form so that the glove shell surrounds the hand-shaped region, and so that the lamination region of the glove shell conforms closely to the laminating surface, placing the laminate preform on the glove shell lamination region above the laminating surface, the exposed layer of lamination adhesive being in direct contact with the glove shell, applying a pressure above ambient pressure at a temperature above ambient temperature to the assembled laminate preform, glove shell, and laminating form, thereby causing the lamination adhesive to bond the laminate preform to the lamination region of the glove shell, and removing the glove shell with the laminate preform bonded thereto from the laminating form, whereby the glove shell after removal from the laminating form assumes a shape that closely approximates the shape of a human hand.

In embodiments, the glove shell is a seamless 3D glove shell.

In some embodiments, the laminating surface of the laminating form is flat. In some of these embodiments, the laminating form includes a pair of opposing surfaces that are overlapping, substantially flat, and substantially parallel to each other, the laminating surface being included in one of the opposing surfaces. And in some of these embodiments applying pressure to the assembled laminate preform, glove shell, and laminating form includes applying pressure using at least one of a platen press, a roll press, a belt press, and a nip roll press.

In various embodiments, the laminating surface is a non-flat, smooth surface. In some of these embodiments, applying pressure to the assembled laminate preform, glove shell, and laminating form includes applying pressure using at least one of a bladder press and a vacuum bag press.

In various embodiments, the glove shell is reversibly deformable, placing the glove shell on the laminating form includes deforming the glove shell, and removing the glove shell with the laminate preform bonded thereto from the laminating form includes allowing the glove shell with laminate preform bonded thereto to recover substantially to the shape of a human hand. In certain of these embodiments, placing the glove shell on the laminating form includes increasing a circumference of a glove shell finger portion by a factor of between 10% and 60%. In some of these embodiments a finger portion of the laminating form is wider and thinner in shape than a human finger, thereby increasing a region of bonding of the laminate preform to a corresponding finger portion of the glove shell, and causing a warping deformation of the laminate preform about the corresponding finger portion of the glove shell due to the shape recovery of the glove shell after it is removed from the laminating form. In other of these embodiments, a finger portion of the laminating form is narrower and thicker in shape than a human finger, thereby limiting a region of bonding of the laminate preform to a corresponding finger portion of the glove shell, and minimizing interference of the laminate preform with the recovery of the glove shell shape upon removal of the glove shell from the laminating form.

In embodiments, the glove shell textile has a total surface energy of greater than 40 mJ/m2.

Various embodiments further include, before placing the laminate preform on the glove shell, removing substantially all spin finish and lubricants from the glove shell textile in the lamination region of the glove shell, such that a Soxhlet extraction with acetone yields less than 1.5% by weight of the glove shell textile.

Embodiments further include, before placing the laminate preform on the glove shell, removing substantially all spin finish and lubricants from the glove shell textile in the lamination region of the glove shell, such that a Soxhlet extraction with acetone yields less than 0.5% by weight of the glove shell textile.

In embodiments, the laminate preform includes at least one of a textile layer, an oriented film, a layer of graphics, a filler having a density that would cause the filler to settle if added to the liquid coating material, and a filler having a density that, if added to the liquid coating material, would increase a viscosity of the liquid coating material, thereby rendering the liquid coating material unsuitable for dip-coating the glove shell.

In various embodiments, preparing the laminate preform includes at least one of printing, roll-to-roll coating, extrusion, stenting, blown extrusion, weaving, and knitting.

In certain embodiments, the layer of lamination adhesive is an adhesive film layer having a thickness of between 6 and 50 microns.

In embodiments, the layer of lamination adhesive is an adhesive film layer, and the method further comprises controlling the thicknesses of the adhesive film layer to within less than +/−5 microns.

In some embodiments, the layer of lamination adhesive has a surface energy that is greater than 30 mJ/m2.

In various embodiments, the laminate preform includes an exposed upper layer, whereby the upper layer and the lamination adhesive layer extend beyond any intervening layers, so that the perimeter of the upper layer is bonded by the lamination adhesive layer directly to the glove shell.

In some embodiments, the pressure above ambient pressure is between 5 psi and 150 psi above ambient pressure. In certain embodiments, the temperature above ambient temperature is between 200 degrees Fahrenheit and 375 degrees Fahrenheit.

Embodiments further include preparing a flat, solid inner laminate preform, the inner laminate preform including an exposed layer of inner lamination adhesive, and placing the inner laminate preform on the laminating surface of the laminating form before placing the glove shell thereupon, so that the inner lamination adhesive is in direct contact with an inner surface of the glove shell, and so that applying pressure to the assembled laminate preform, glove shell, inner laminate preform, and laminating form causes the inner lamination adhesive to bond the inner laminate preform to the inner surface of the glove shell.

And various embodiments further include attaching a cut-and-sew inner liner inside of the glove shell before placing the inner lining and glove shell onto the laminating form.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 8C is a cross-sectional view similar to FIG. 1C, except that the glove shell fingers are reversibly narrowed by the fingers of the laminating form;

FIG. 8D is a cross sectional view of the glove fingers of FIG. 8C after having been removed from the laminating form and having recovered from deformation;

DETAILED DESCRIPTION

The present invention is a method of manufacturing a glove having a shape that closely approximates the shape of a human hand, wherein the glove includes a performance-enhancing layer adhesively laminated to a hand-shaped glove shell using an adhesive that requires application of pressure at an elevated temperature, and whereby the performance-enhancing layer includes at least one feature that cannot be provided by dipping of the glove shell in a coating material. In embodiments, the glove shell is a seamless, 3D glove shell.

Figure 1A:
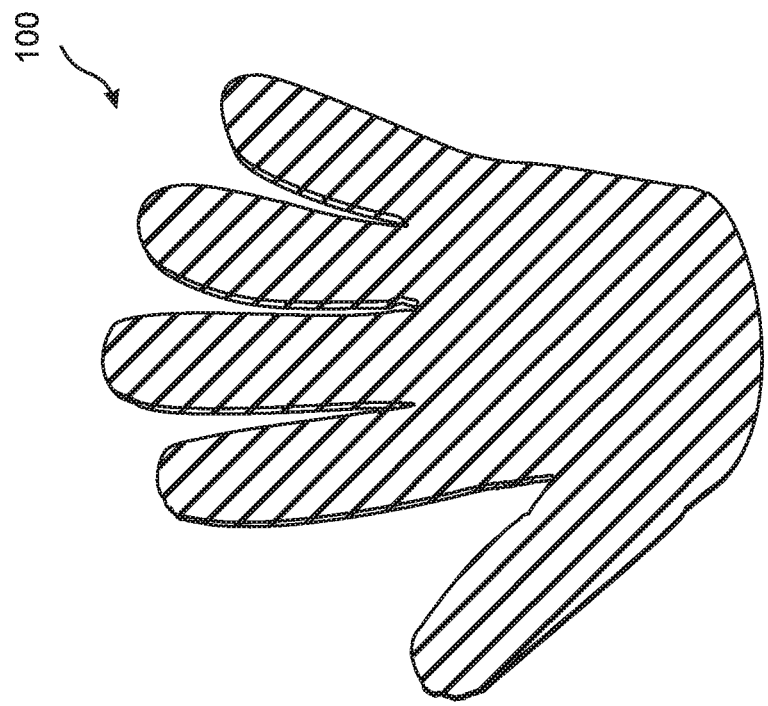
FIG. 1A is a front perspective view of a laminating form and a laminate preform before assembly.
Figure 1A:
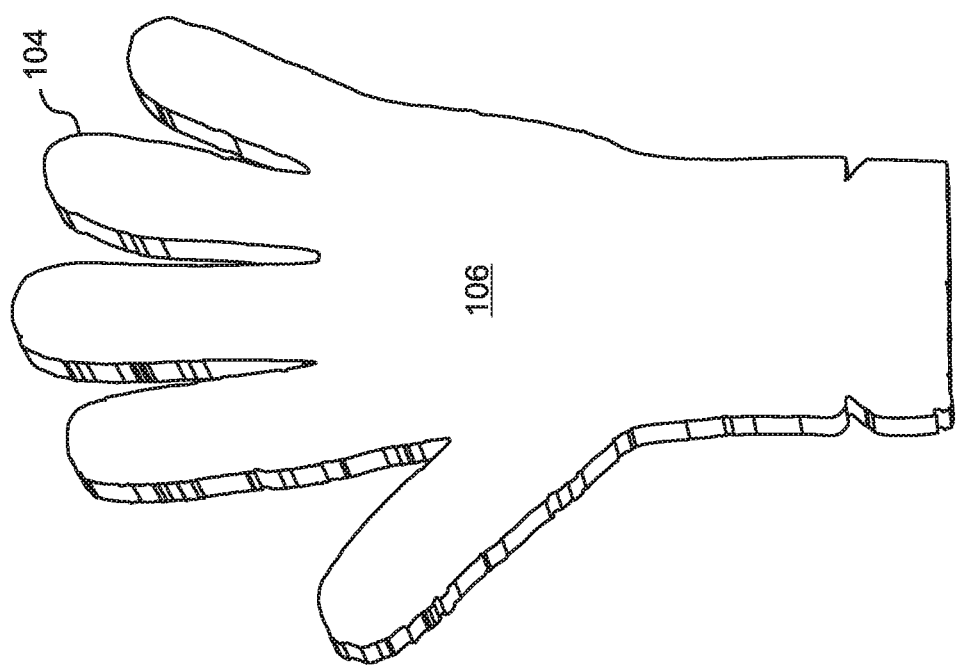
Figure 1B:
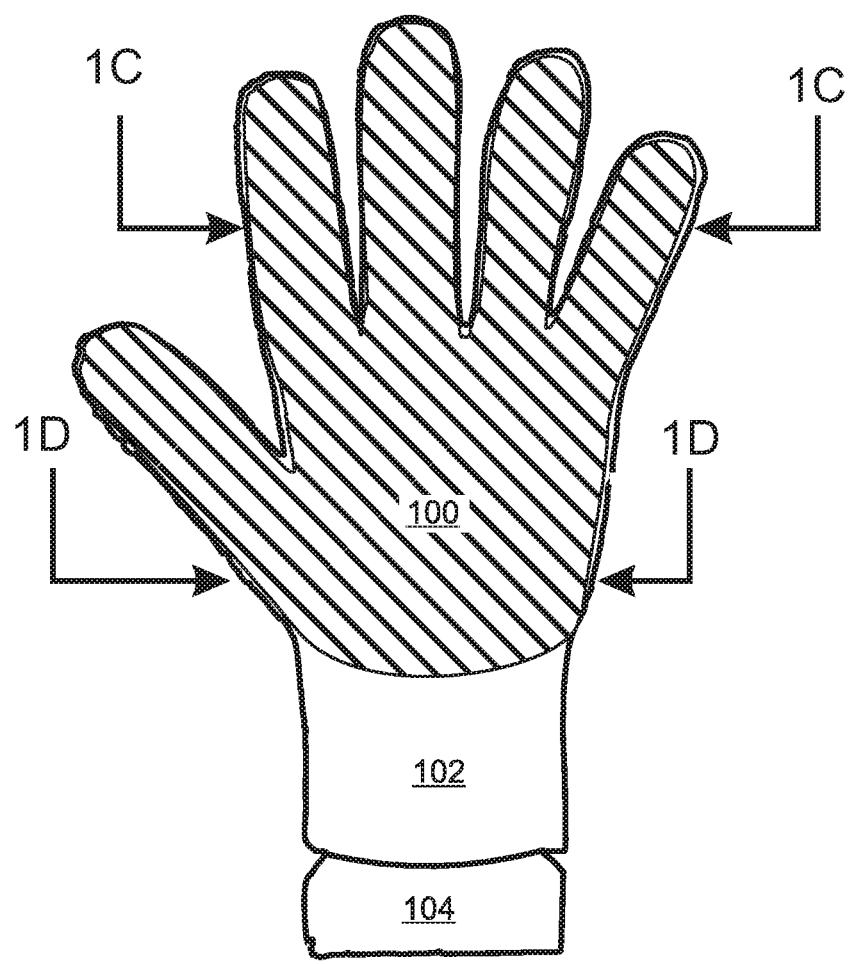
FIG. 1B is a front perspective view of a laminating form, a glove shell, and a laminate preform assembled in preparation for lamination.

With reference to FIGS. 1A and 1B, the method of the present invention includes preparing and assembling one or more solid, performance-enhancing layers 100, referred to herein collectively as the "laminate preform," or simply as the "laminate." The glove shell 102, which in FIGS. 1A and 1B is a seamless, 3D glove shell, is placed on a 3D laminating form 104 that provides at least one smooth, wrinkle-free laminating surface 106, and the laminate preform 100 is then placed in contact with the palm, fingers, and/or back of the glove shell positioned over the laminating surface 106. In the embodiment of FIGS. 1A and 1B, the laminating surface 106 and the laminate preform 100 are flat, such that the glove shell 102 is temporarily distorted in shape when placed on the laminating form 104, and the returns elastically to assume the shape of a human hand after lamination.

Figure 1C:
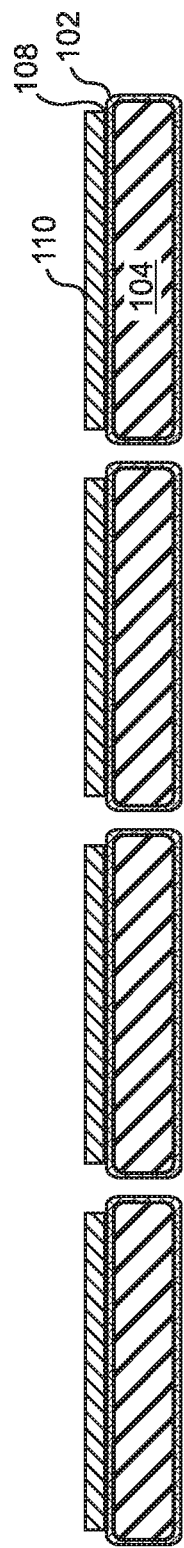
FIG. 1C is a cross sectional view of FIG. 1B taken through the finger region.
Figure 1D:
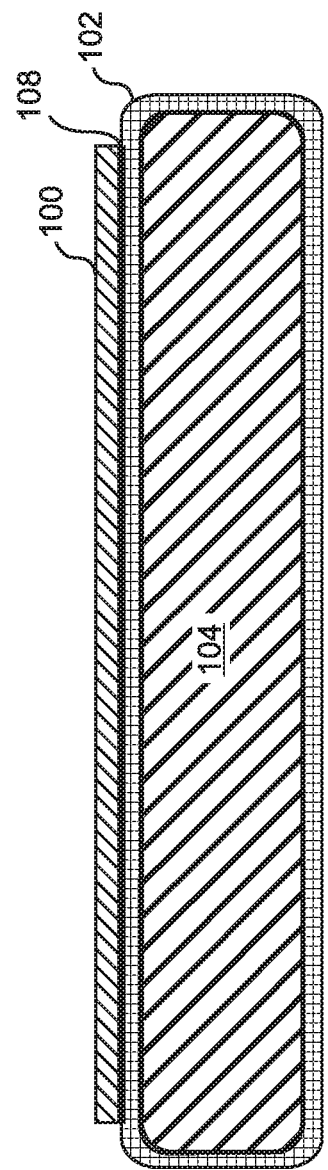
FIG. 1D is a cross sectional view of FIG. 1B taken through the palm region.

With reference to FIGS. 1C and 1D, which are cross-sectional views as indicated in FIG. 1B, a non-liquid, thin film laminating adhesive 108 is included between the laminate preform 100 and the glove shell 102 (and in some embodiments also between layers of the laminate preform). In embodiments, the laminate adhesive 108 is a solid at ambient pressure and temperature, and is included at least on one of the outward-facing surfaces of the laminate preform 100.

Pressure is then applied to the assembled laminating form 104, glove shell 102, and laminate preform 100 at an elevated temperature, so as to adhesively bond the laminate preform 100 to the glove shell 102.

Of course, because there are no sewing attachments between the laminate preform 100 and the glove shell 102, as is typical in glove assemblies of the prior art, it is important that the laminate preform 100 be well bonded to the glove shell 102, since poor bonding could result in premature product failure. Two factors are critical to the quality of the bond between the laminate preform 100 and the glove shell 102. First, the surface of the glove shell fiber must be free of spin finish and lubricants that are used in production of yarns and textiles. A suitable scouring process is generally required, and the Soxhlet extraction with acetone must be below 1.5% by weight of the textile, with a more preferred value of 0.5% for best durability of the bond.

The second factor that is critical to the quality of the bond is the surface match of the glove shell fiber and the lamination adhesive 108. Both surface energies must be high enough to make wetting and long term bonding thermodynamically favorable. In embodiments, the glove shell textile has a total surface energy of greater than 40 mJ/m$^2$. Cotton and nylon meet these criteria, whereas PET fiber does not without a modifying treatment or coating. In embodiments, the adhesive surface energy is greater than 30 mJ/m$^2$. SBR and urethane adhesives meet this surface energy requirement. These examples are not intended to be exhaustive, and many fiber and adhesive combinations can provide the adhesion performance required by this invention. In wear trials, it has been found that a laminate preform bonded to the glove shell tested using ASTM D1876-08 standard test method for peel resistance of adhesives (T-Peel Test) with a 1" wide peel sample that has 5 average peak peel forces of greater than 5 lbf/inch will meet the requirements of this invention for durability.

The bonding of the laminate preform 100 to the glove shell 102 can use any of various adhesive processes. Thermoplastic, pressure-sensitive, and reactive adhesives are all effective, and are included within the scope of the invention so long as application of pressure at an elevated temperature is required. In embodiments, penetration of the lamination adhesive 100 into the glove shell 102 is controlled, since the stiffness of the glove shell 102 tends to increase as more adhesive penetrates into the textile of the glove shell 102, and soft, flexible glove shells 102 are typically desired. The use of non-liquid thin film adhesives 108 in the present invention provides excellent laminate adhesion and very controlled and limited penetration of the lamination adhesive 108 into the textile of the glove shell 102. In embodiments, thin adhesive films 108 of between 6 and 50 microns thickness are used, so as to provide only limited penetration of the adhesive 108 into the fibers of the glove shell 102.

A key aspect in embodiments of the present invention is the capacity to combine seamless 3D glove shells 102 having accurate hand-shapes with solid laminate preforms 100 that include features which cannot be provided by glove shell dipping methods. Printed graphics, high filler loaded elastomers, textile layers, and oriented films are all important examples of materials and features that can only be included in the enhancing layer if the enhancing layer is prepared ahead of time as a solid, laminate preform 100. In embodiments where the laminate preform is flat, this approach allows such features to be added to the solid laminate preform 100 by using such methods as printing, roll to roll coating, gravure coating, extrusion, stenting, blown extrusion, weaving, and/or knitting, before the laminate preform 100 is laminated onto the glove shell 102.

It is important to note that, in embodiments, the laminate preform production methods have very tight control of materials properties and tight control of the preform thickness. In some embodiments the thicknesses of the adhesive and other film layers are controlled to less than +/−5 microns.

Figure 2A:
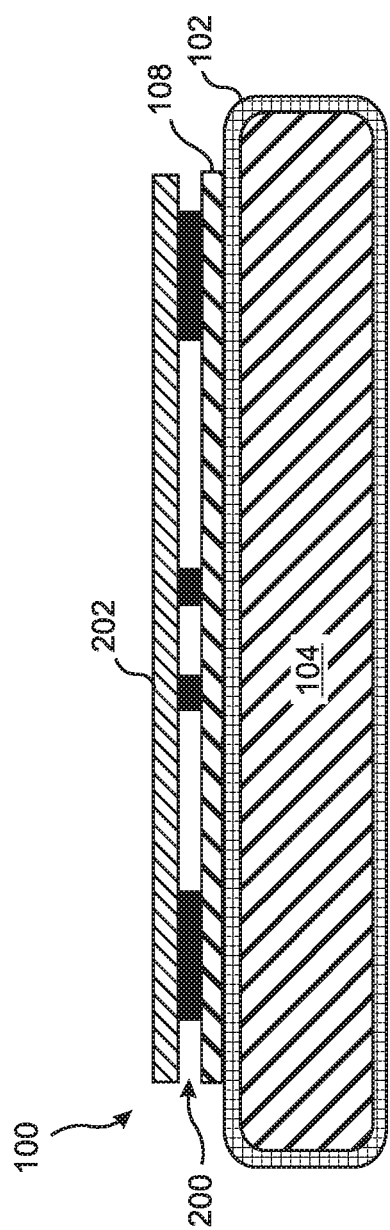
FIG. 2A is a cross sectional view similar to FIG. 1D, but of an embodiment wherein the laminate preform includes a graphics layer between an outer layer and an adhesive layer.
Figure 2B:
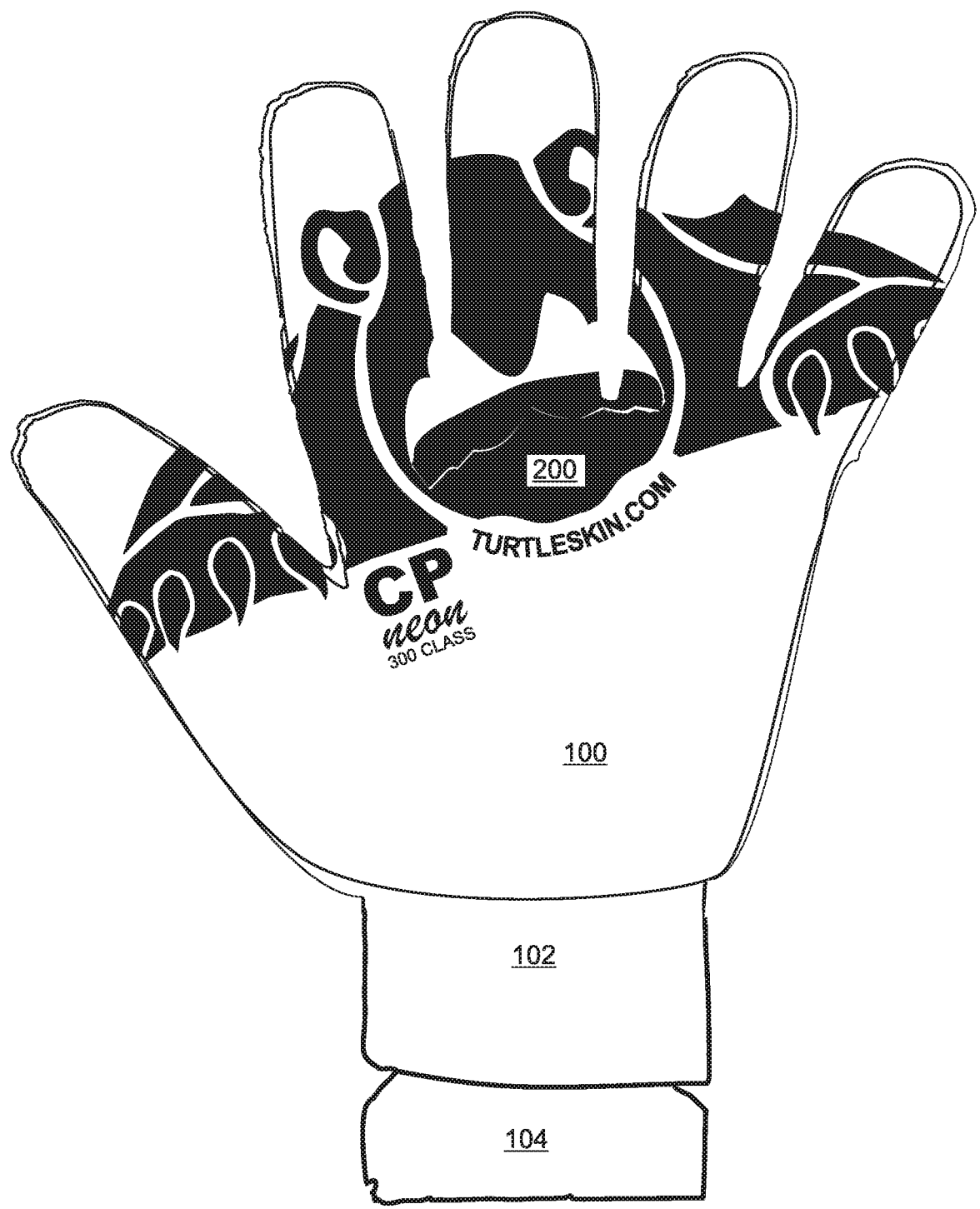
FIG. 2B is a front view of an embodiment similar to FIG. 2A, showing a graphics layer visible below a transparent outer layer.

In the embodiment of FIGS. 1A-1D, the laminate preform 100 is a flat, single layer of elastomeric film 110 combined with a thermoplastic adhesive 108. In the embodiment of FIGS. 2A and 2B, the laminate preform 100 includes a graphics layer (fusable ink) 200 included between a grip layer (thermoplastic urethane, "TPU") 202 and the adhesive layer 108. The ability to include such graphical layers in the laminate preform 100 provides opportunities for durable labeling and branding that cannot be obtained when enhancement layers are applied by dipping. Of course, graphics can always be applied to the surface of a finished glove, but then the graphics will not be embedded within nor protected by the performance-enhancing layer.

In various embodiments, a digital inkjet, a screen printing, or a web press printing process is used to form a graphics layer 200 on top of the adhesive layer 108. In a second laminate preforming step, the graphics layer 200 is protected with an abrasion layer 202 laminated over the print layer. This three ply laminate preform 100 is then applied to the glove shell 102 by thermoplastic bonding of the adhesive layer 108 during the lamination step. Because the graphics layer is built on a smooth polymeric or elastomeric film, fine detail and print quality are preserved. This fine print detail is not possible when printing directly on the surface of a textile or on a dipped textile surface.

As discussed above, the adhesive strength and quality of the bond between the laminate preform 100 and the glove shell 102 is one important factor in preventing failure of the bond and maintaining the integrity of the laminated glove. Another important factor is the edge condition of the bond between the laminate preform 100 and the glove shell 102. It can be shown that the peel resistance of an elastic film is higher than the peel resistance of a high modulus film when bonded at the same specific adhesive strength. The reason for this is that an elastic film stretches and spreads the stress at the peel point, whereas a hard film cannot stretch and deform. As a result, a peel crack is propagated at lower loads for hard films.

Embodiments in which thermoplastic urethane ("TPU") film is bonded to a nylon glove shell 102 provide excellent results in this regard, because the TPU is low modulus (400-500% elongation at break), and the nylon is also low modulus for fiber (30% elongation at break). Even in embodiments where the glove shell 102 has a high modulus, use of a low modulus laminate preform 100 provides better peel resistance as compared to a high modulus laminate preform 100. In various embodiments, elastomeric films of greater than 100% elongation are included in the laminate preform 100.

Figure 3:
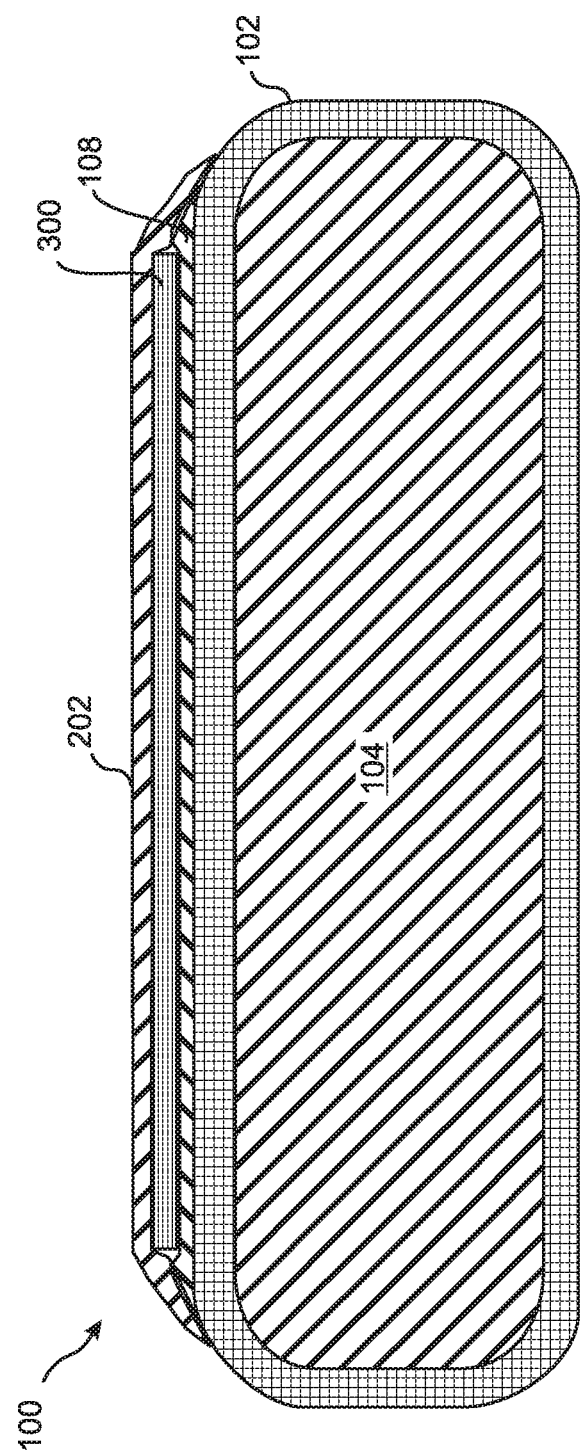
FIG. 3 is a cross sectional view similar to FIG. 2A, but of an embodiment wherein the laminate preform includes an oriented film between an outer layer and an adhesive layer, the outer layer and adhesive layers being extended beyond the film layer so that the circumference of the outer layer is bonded directly to the glove shell.
Figure 4:
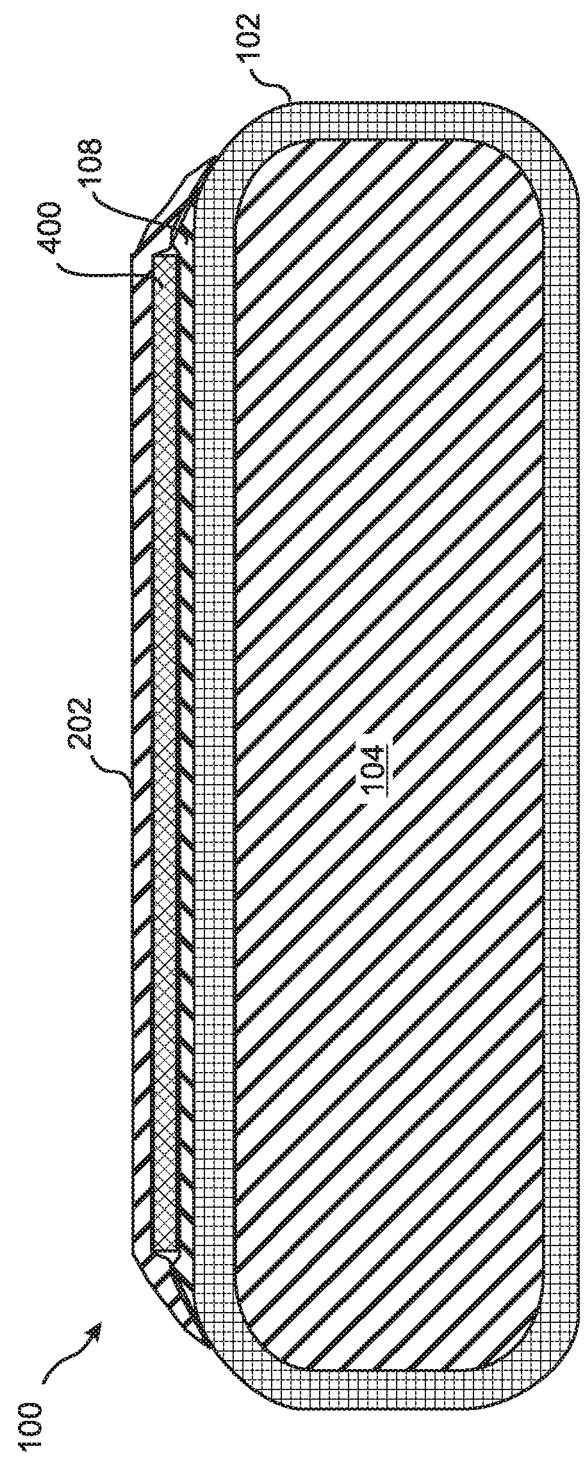
FIG. 4 is a cross sectional view similar to FIG. 3, but of an embodiment wherein the laminate preform includes a fabric layer between the outer layer and the adhesive layer.

With reference to FIGS. 3 and 4, in certain embodiments where a top layer 202 of a multi-layer laminate preform 100 has a low modulus, but one or more layers below the top layer have a high modulus, the edge of the laminate preform is "stepped" by extending the top layer 202 beyond the lower layers, so that the top layer 202 is directly bonded to the glove shell 202. This approach provides a high peel condition at the edge of the laminate preform 100, even when stiff layers are included in the central region of the laminate preform 100.

In the embodiment of FIG. 3, a high modulus oriented film 300 is included between the grip layer 202 and the adhesive layer 108, and in FIG. 4 a high modulus textile layer 400 is included between the grip layer 202 and the adhesive layer 108.

Figure 5:
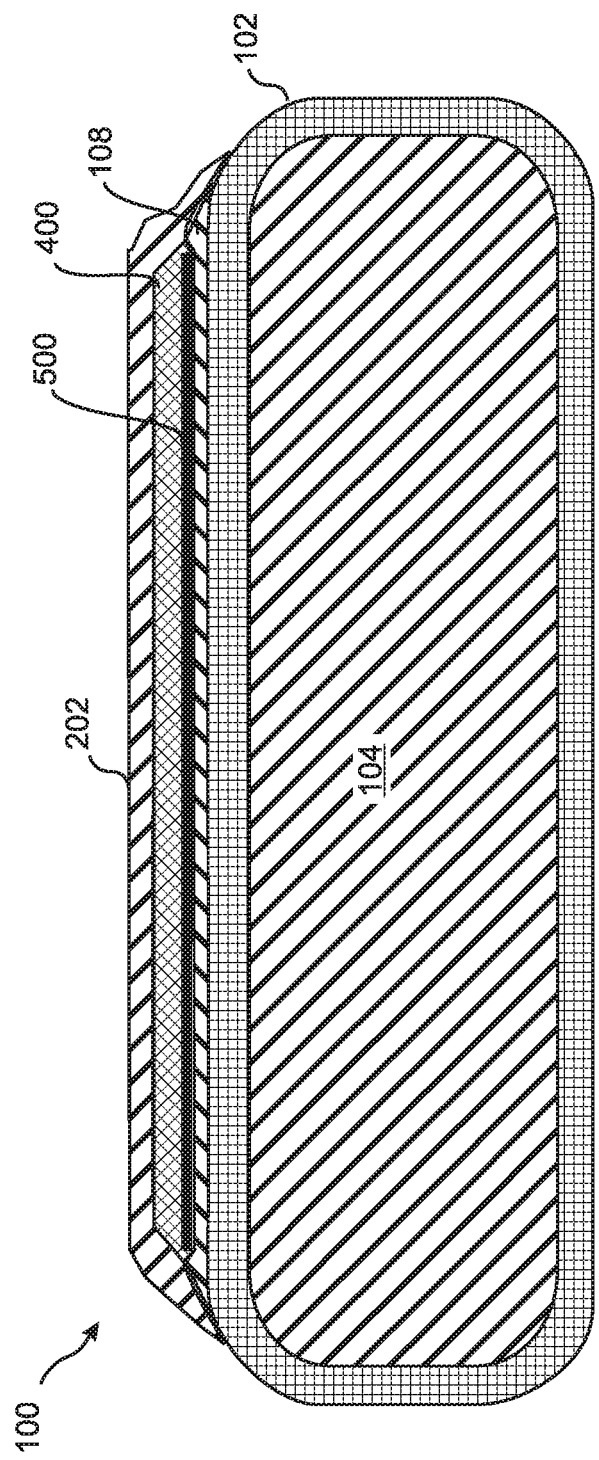
FIG. 5 is a cross sectional view similar to FIG. 4, but of an embodiment wherein the laminate preform includes both a fabric layer and a filled elastomer layer between the outer layer and the adhesive layer.

FIG. 5 is similar to FIG. 4 except that a filled polymer layer 500 is included beneath the textile layer 400. In Example #3 described below, 600-50 grit 5 silicon carbide grain is used as a filler in one of the prefabricated elastomer layers. In various embodiments, ceramic and/or metallic fillers are included which have specific gravities of between 2 and 14. Fillers having such high densities would segregate in a low viscosity coating, such as a coating applied by dipping. However blade coating and extrusion are very effective for production of films with dense fillers that can be included in flat embodiments of the laminate preform. In one example, Styrene Butadiene rubber elastomer was dissolved in solvent and a ceramic grain was mixed in at 10K centipoise. This mix 500 was coated to a film using a knife over roll process. In a similar example, a 200 and 660 grit coating having a viscosity of between 2500 and 5000 cps was applied to a chloroprene film as part of a laminate preform 100. Many other powdered, fibrous, and platelet type fillers are included in embodiments of the present invention to impart valuable permeability, cut, abrasion, flame, heat, and other properties to the laminate preform 100, where such fillers at their required loadings result in excessive viscosity that would prevent them from being used in a dip coating process.

Figure 6:
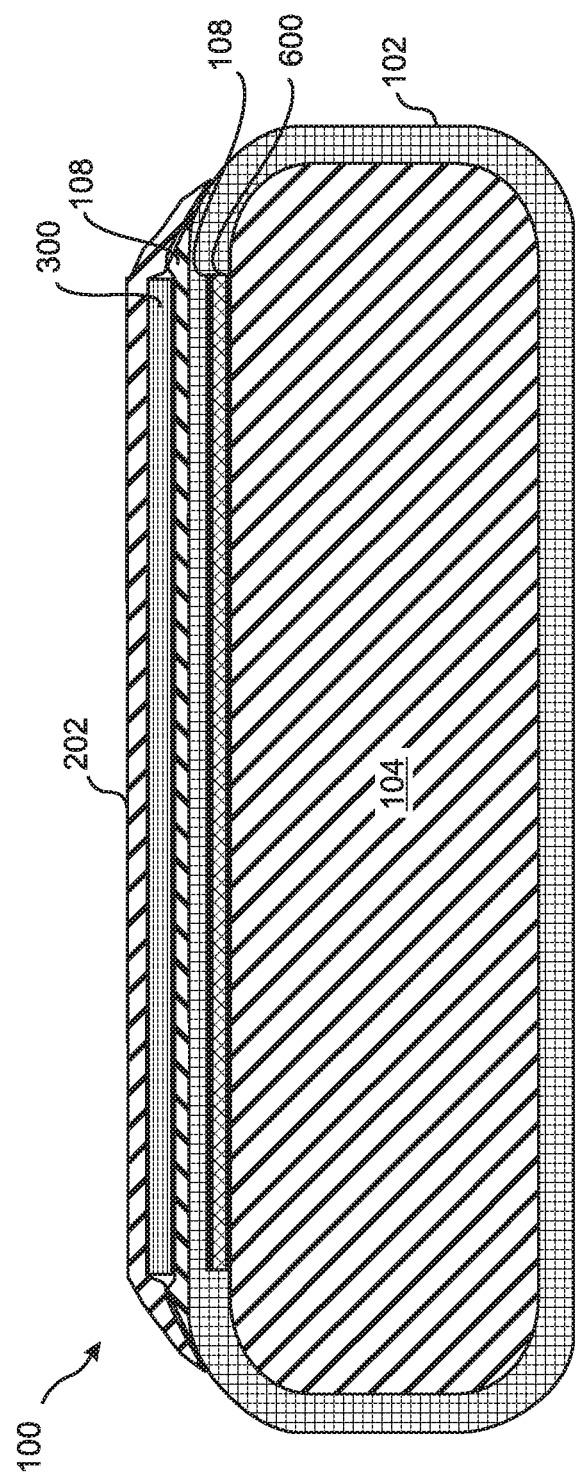
FIG. 6 is a cross sectional view similar to FIG. 3, but of an embodiment that also includes an inner laminate preform bonded to an inner surface of the glove shell.

With reference to FIG. 6, embodiments of the present invention include a second laminate preform 600 that is laminated to the inner surface of the glove shell 102. In the embodiment of FIG. 6, a layer 600 that mechanically resists cuts and punctures is placed between the 3D laminating form 104 and the glove shell 102, so that it is laminated to the inner surface of the glove shell 102. The outer laminate preform includes an oriented polymer film 300 between a TPU grip layer 202 and an adhesive layer 108.

Figure 7:
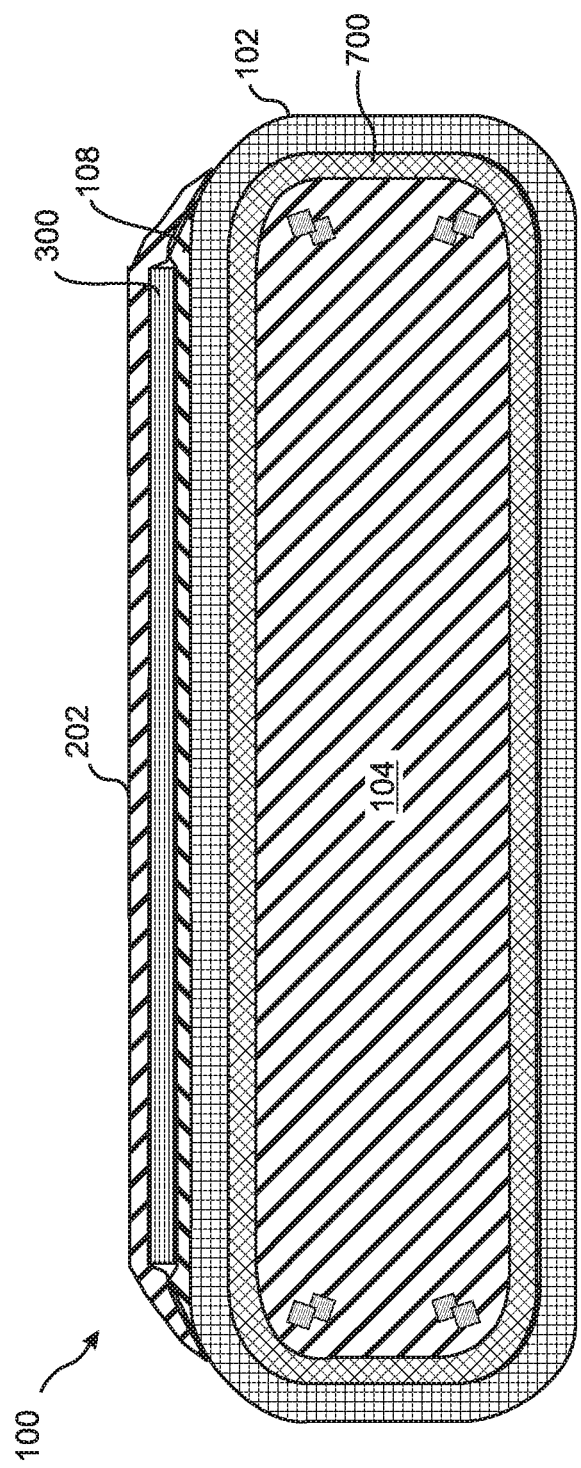
FIG. 7 is a cross sectional view similar to FIG. 3, but of an embodiment that also includes a cut-and-sew liner attached within the glove shell.

With reference to FIG. 7, in various embodiments a cut-and-sew liner 700 is attached inside of the glove shell 102, and is included with the glove shell 102 on the 3D laminating form 104. The resulting glove includes the cut-and-sew liner in its interior and the laminate preform on its exterior surface, with the knit or woven glove shell 102 in between.

Figure 8A:
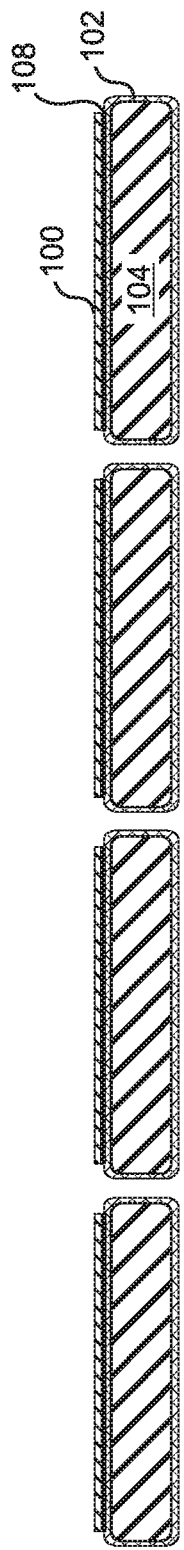
FIG. 8A is a cross-sectional view similar to FIG. 1C, except that the glove shell fingers are reversibly widened by the fingers of the laminating form.
Figure 8B:
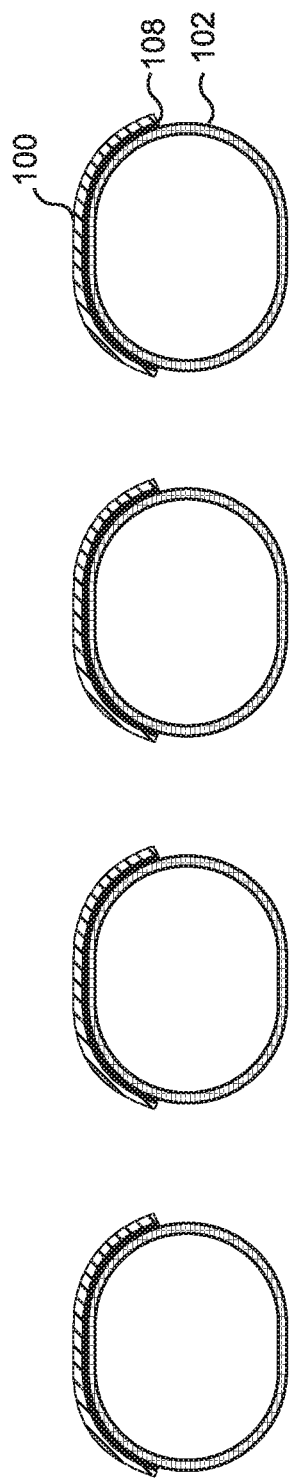
FIG. 8B is a cross sectional view of the glove fingers of FIG. 8A after having been removed from the laminating form and having recovered from deformation.

In various embodiments, the glove shell 102 is reversibly deformable, whereby its shape is deformed while it is mounted on the 3D laminating form 104. In embodiments, this is helpful in providing the smooth, crease-free area that is required for lamination. FIG. 8A is a cross-sectional illustration of such an embodiment taken through the finger region. With reference to FIG. 8B, the glove shell fingers return to their accurate, rounded 3D finger-shapes after the laminate preform 100 is applied thereto and the resulting glove is removed from the 3D laminating form 104.

An important aspect of some of these embodiments is the way in which the glove shell 102 contracts after it is removed from the 3D lamination form 104. In embodiments, the regions that are laminated to the preform do not fully recover from being stretched, such that the recovery after stretching is proportionately greater in the regions that are not laminated.

In some of these embodiments, the shape of the laminating form is adjusted so as to take advantage of this effect. For example, with reference to FIG. 8A, in embodiments where the laminating form 104 includes two opposed, flat surfaces, and in cases where the laminate preform 100 is highly flexible and it is desirable that the preform 100 extend between the fingers, one or more of the finger portions of the laminating form 104 can be made thinner and wider than a human finger, as illustrated in FIG. 8A, so that an extended region is presented e.g. on the palm side of the form 104 for lamination, after which recovery of the non-laminated side and back regions of the fingers increases the wrap of the preform by pulling the initially flat preform 100 into a curved shape that extends between the fingers, as shown in FIG. 8B.

In some of these embodiments, the glove shell fingers are elongated in their circumference by between 10% and 60% when the glove shell 102 is on the 3D laminating form 104. This increases the surface area of the glove shell fingers that is wrinkle free and monotonic in surface curvature (fully flat is not required), and is thereby available for bonding of the laminate preform thereto. After the lamination step, the 3D laminating form 104 is removed and the glove shell 102 can recover its shape. The laminated area tends not to recover, but instead tends to retain its laminated width.

In some of these embodiments a laminate preform 100 is not applied to the backs of the finger and hand regions of the glove shell, so that most of the shape recovery takes place in these unlaminated regions. The result is that after the glove is removed from the 3D laminating form 104, a higher percentage of the finished finger circumference is covered by the laminate preform 100 than was covered when the glove was on the 3D laminating preform. If the ratio of width to thickness on the 3D laminating preform 104 is 10:1 for example, then 40% of the elongated circumference is readily bonded to the laminate perform 100, and the ratio of back of hand and sides to laminate width is approximately 4:6. However, after removal from the 3D laminating form 104, if the back of hand and sides contract by 50%, the laminated length will have a ratio to the back and sides of 4:3, significantly increasing the coverage of the laminate preform 100 in the relaxed glove.

With reference to FIG. 8C, in other cases, for example where the laminate preform 100 is relatively stiff and application of the preform 100 is desired only on inner and/or outer surfaces of the glove fingers, one or more of the finger portions of the laminating form 104 can be made narrower and thicker than a human finger, as shown in FIG. 8C, so that relatively more of the glove finger material extends along the sides of the laminating form "fingers," and relatively less is presented in the palm and/or back regions for lamination. This approach limits the laminate preform 100 to narrower regions of the glove fingers, as shown in FIG. 8D, and thereby minimizes any distortion of the shapes of the glove fingers after lamination.

Figure 9:
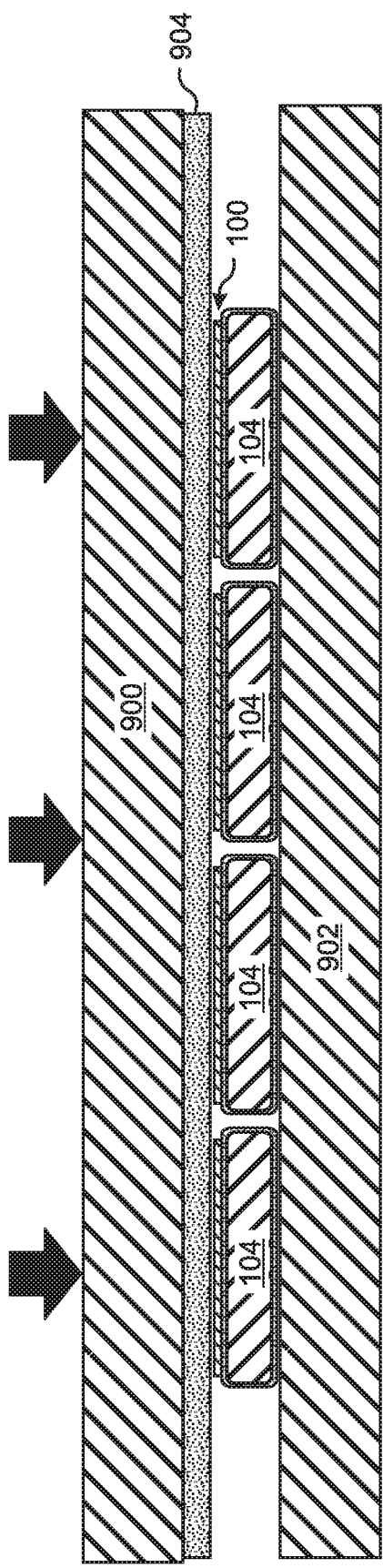
FIG. 9 is a cross sectional view of the embodiment of FIG. 1C being laminated in a platen press.

In the embodiments of FIGS. 1A through 8B, the 3D laminating form 104 includes opposing flat surfaces 106, and the lamination pressure can be applied by a press such as a platen press that is designed to apply pressure to a substantially flat surface. This is illustrated in FIG. 9, where a cross section of the finger regions illustrated in FIG. 1C are shown as being pressed at an elevated temperature between a pair of hot press platens 900, 902. In embodiments, the lamination temperatures range from 200 degrees Fahrenheit to 375 degrees Fahrenheit for bonding of the laminate preform 100 to the glove shell 102, and the applied lamination pressures range from 5 psi to 150 psi. The layer 904 shown between the upper platen 900 and the glove is a conforming layer that is made from a heat resistant elastomer and improves the uniformity of contact between the glove and the press platen face.

While FIG. 9 is illustrated as a vertical platen press, in similar embodiments a roll press, a belt press, and/or a nip roll press is used to laminate the laminate preform 100 to the glove shell 102.

Figure 10:
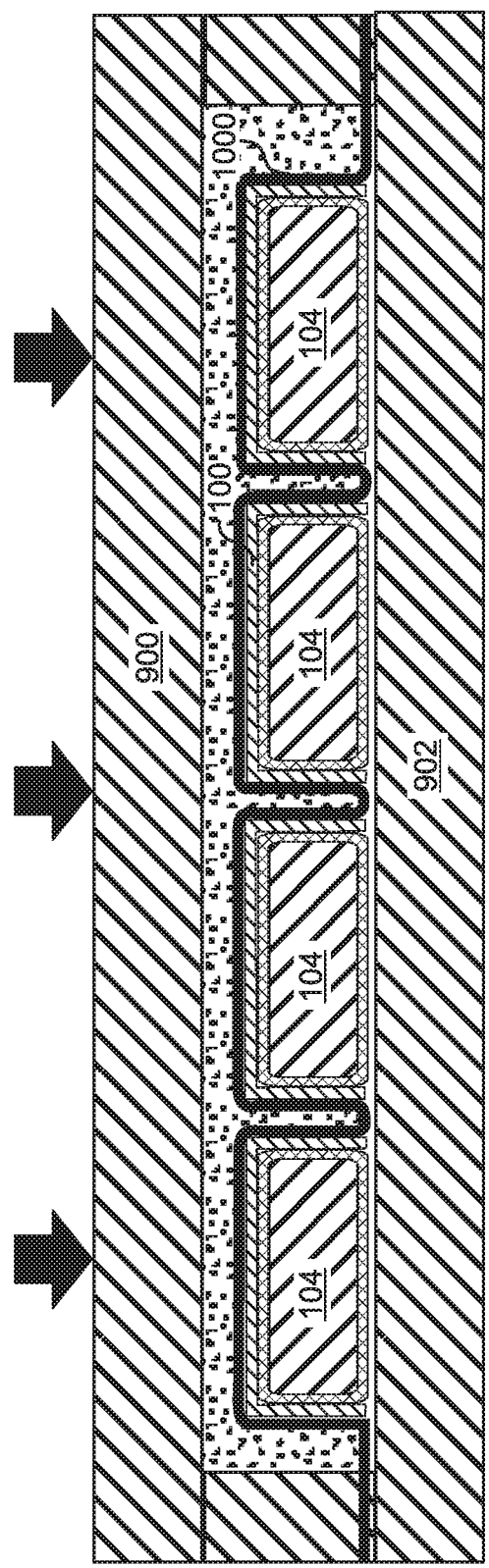
FIG. 10 is a cross sectional view of an embodiment similar to the embodiment of FIG. 1C but wherein the laminate preform extends to the sides of the glove shell fingers, the embodiment being laminated in a bladder press.

In other embodiments, the laminating surface 106 of the 3D laminating form 104 is curved or otherwise shaped, although it is always smooth and free of creases. In embodiments where increased wrap-around of the laminate preform 100 on the glove shell 102 is desired, and/or where the laminating surface 106 is not flat, bladder presses and vacuum bag techniques are used to apply the laminating pressure. With reference to FIG. 10, the conformability of the bladder or vacuum bag 1000 permits the laminate preform 100 to wrap around the fingertips and fourchette area of the glove shell. FIG. 10 illustrates an embodiment where the laminate preforms 100 extend to the sides of the glove shell fingers 104, and a bladder 1000 is forced either pneumatically or hydraulically against the tops and sides of the glove shell fingers, thereby laminating the fingers on three sides. By using two laminate preforms 100, this approach can provide complete coverage of the glove shell 102. In the same way, a bladder press or a vacuum bag press can be used to apply laminating pressure to a laminate preform 100 that is placed against a smooth, curved surface 106 such as the palm of an accurately hand-shaped 3D laminating form 104.

One of the benefits of various embodiments of the present invention is the thinness of the laminate preform that can be provided, and the resulting flexibility of the glove. For measuring these benefits, we have selected the ASTM D4032-08 standard test method for stiffness of fabric by the circular bend procedure. This test uses a standard 4"×8" test coupon. We have modified this method to use the palm and back of the gloves under test. After slitting the glove up one side and removing the fingers and thumb, the remaining coupon for an extra-large glove is very nearly 4 inches×8 inches. The circular bend test is sensitive to small changes in the glove and laminate system. In some cases, we find that it is necessary to precondition the palm-back glove test coupons by multiple runs on the circular bend test to reach stable conditioned values. In the case of conditioned test values, we run the test 10 times and use the average of the results from tests 8, 9, and 10 as the stable conditioned circular bend result.

Embodiments of the present invention include laminate preforms that are much thinner than can be achieved with dipping processes. In some embodiments, the thickness of the laminate preform is between 25 microns and 75 microns, which provides a low bending stiffness. Even in embodiments where textile inserts and textile components are used in the laminate preforms, the circular bending stiffness is much lower than what can be provided by dipped gloves, and very much lower than what is found in gloves that include multiple layers of protective textile and dipped surfaces.

Figure 11A:
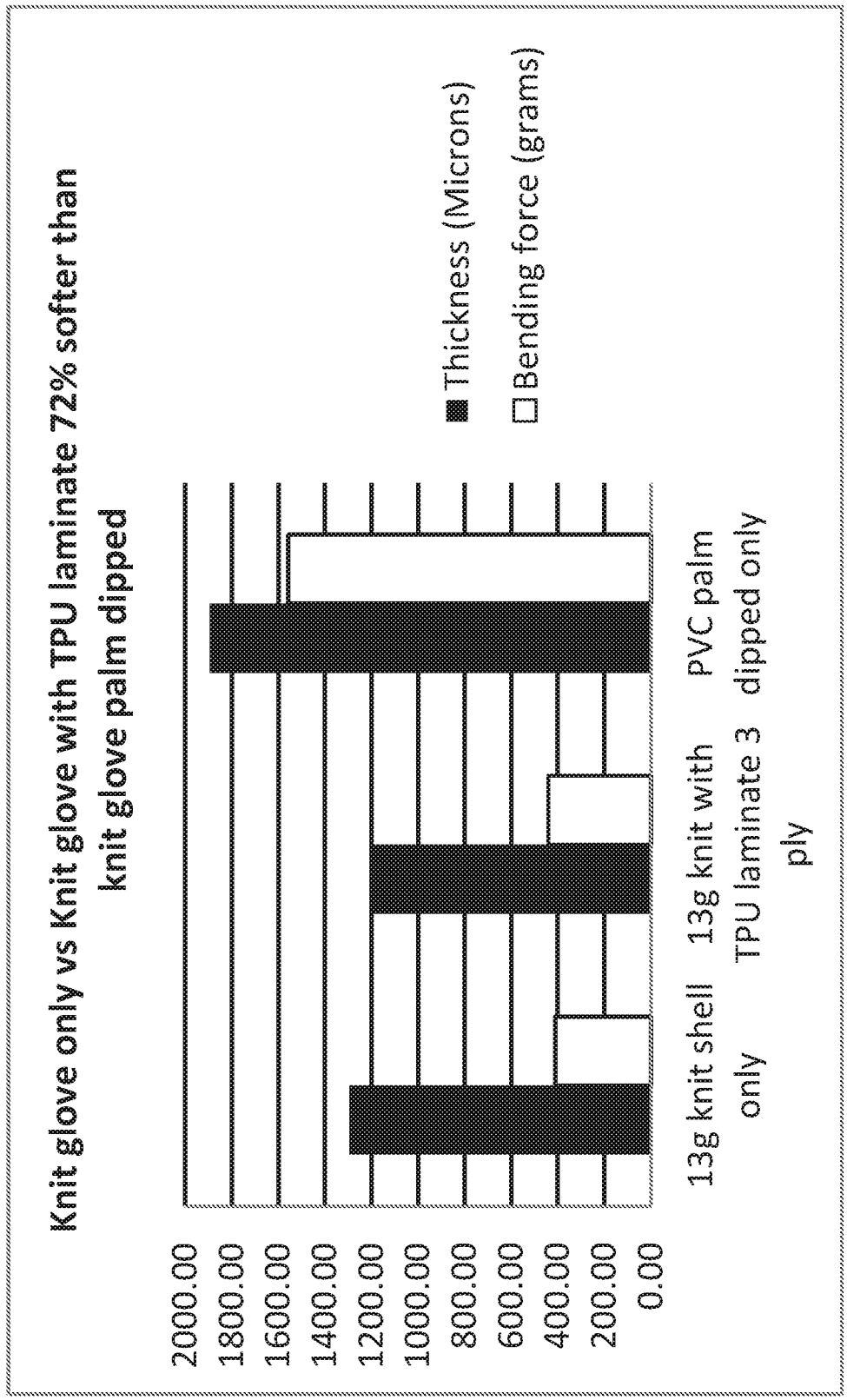
FIG. 11A is a bar graph comparing a knit glove with no applied enhancement layer with a knit glove to which a TPU laminate preform has been applied, and demonstrating that the knit glove with laminate preform is 72% softer than a knit glove that has been palm dipped.

FIG. 11A is a bar graph comparing a knit glove with no applied enhancement layer with a knit glove to which a TPU laminate preform has been applied, and demonstrating that the knit glove with laminate preform is 72% softer than a knit glove that has been palm dipped. The first values in the graph are the thickness and bending stiffness of a 13 g 210 Denier nylon glove shell at approximately 400 g of bending stiffness. The next set of values refers to the same shell after application thereto of a 3 ply 60 micron laminate of TPU with a graphics layer. As can be seen from the data, the lamination process reduces the thickness of the knit, resulting in a slightly thinner glove even with the addition of the laminate preform. The third set of data refers to a directly comparable palm-coated dipped glove with a typical dipping thickness of 300-350 microns. As can be seen from the graph, the lamination process produces a glove that is almost as soft as the uncoated knit at 410 vs 440 grams, and the invention results in gloves with less than ⅓ of the stiffness of comparable dipped gloves.

Figure 11B:
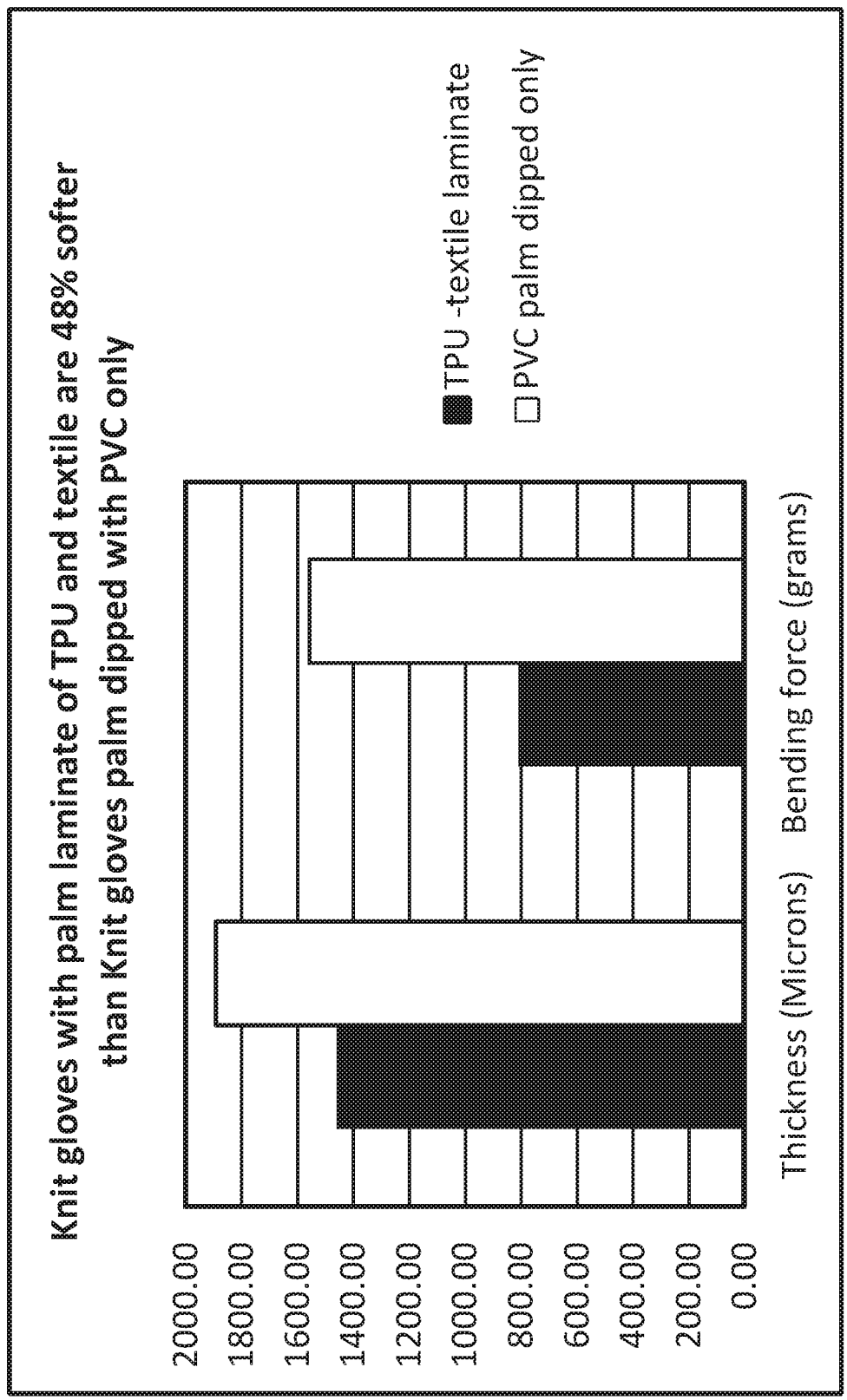
FIG. 11B is a bar graph showing that a knit glove with a TPU and textile laminate preform applied to the palm is 48% softer than a knit glove that has been palm-dipped with PVC only.
Figure 11C:
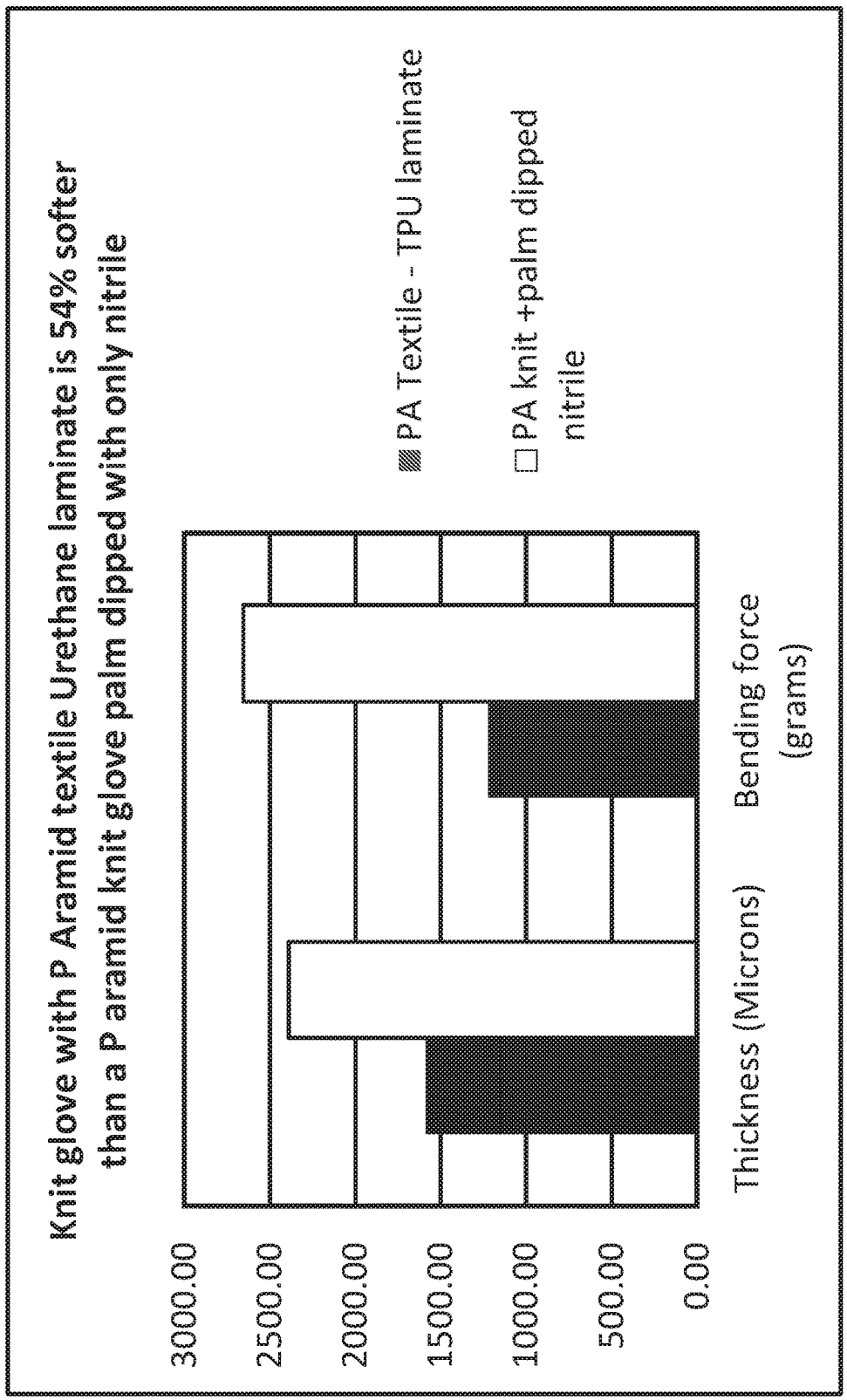
FIG. 11C is a bar graph showing that a knit glove with a para-aramid textile and urethane laminate preform applied to the palm is 54% softer than a para-aramid knit glove that has been palm dipped with only nitrile.
Figure 11D:
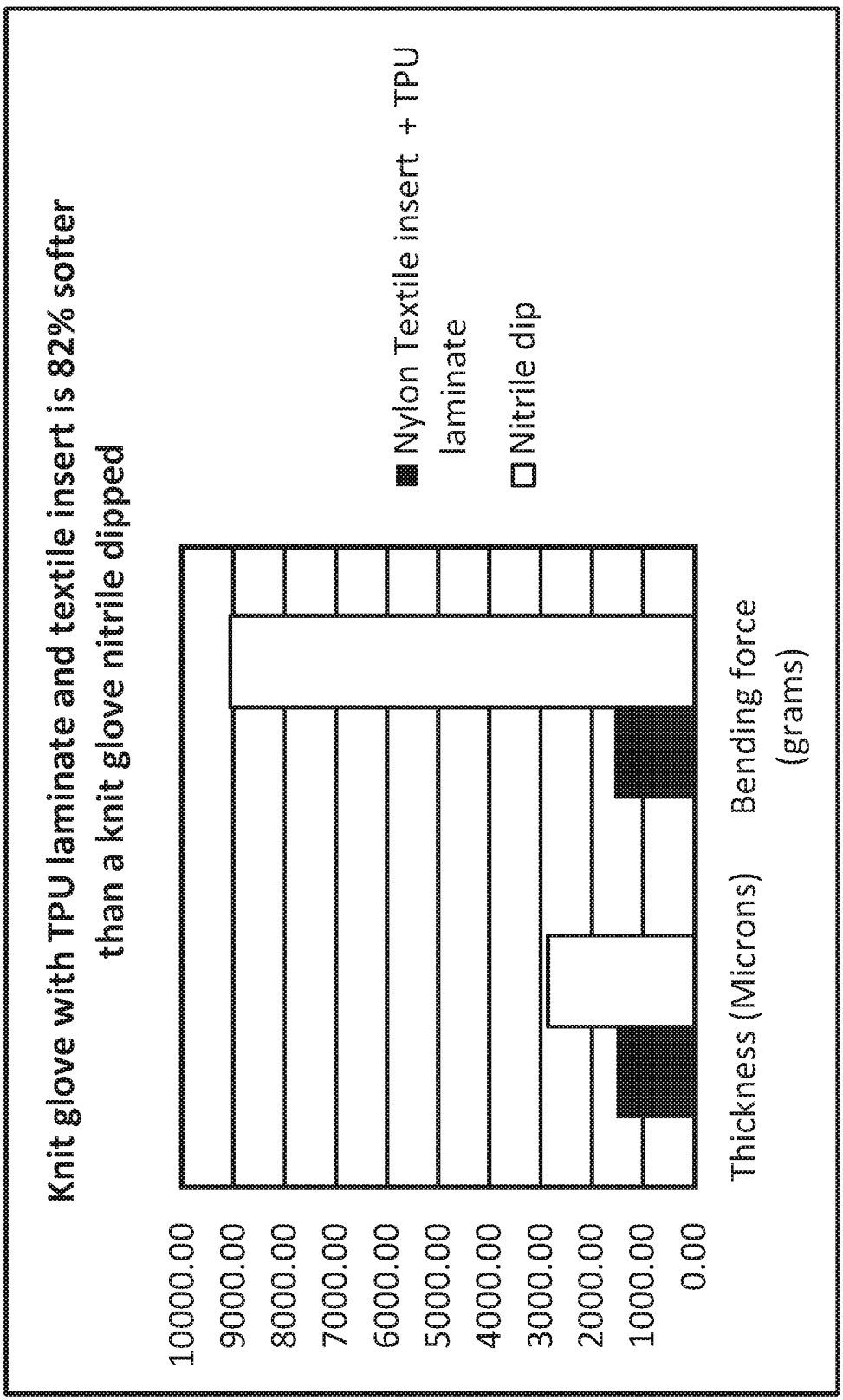
FIG. 11D is a bar graph showing that a knit glove with a TPU laminate preform and including a textile insert is 82% softer than a knit glove that has been nitrile dipped.
Figure 11E:
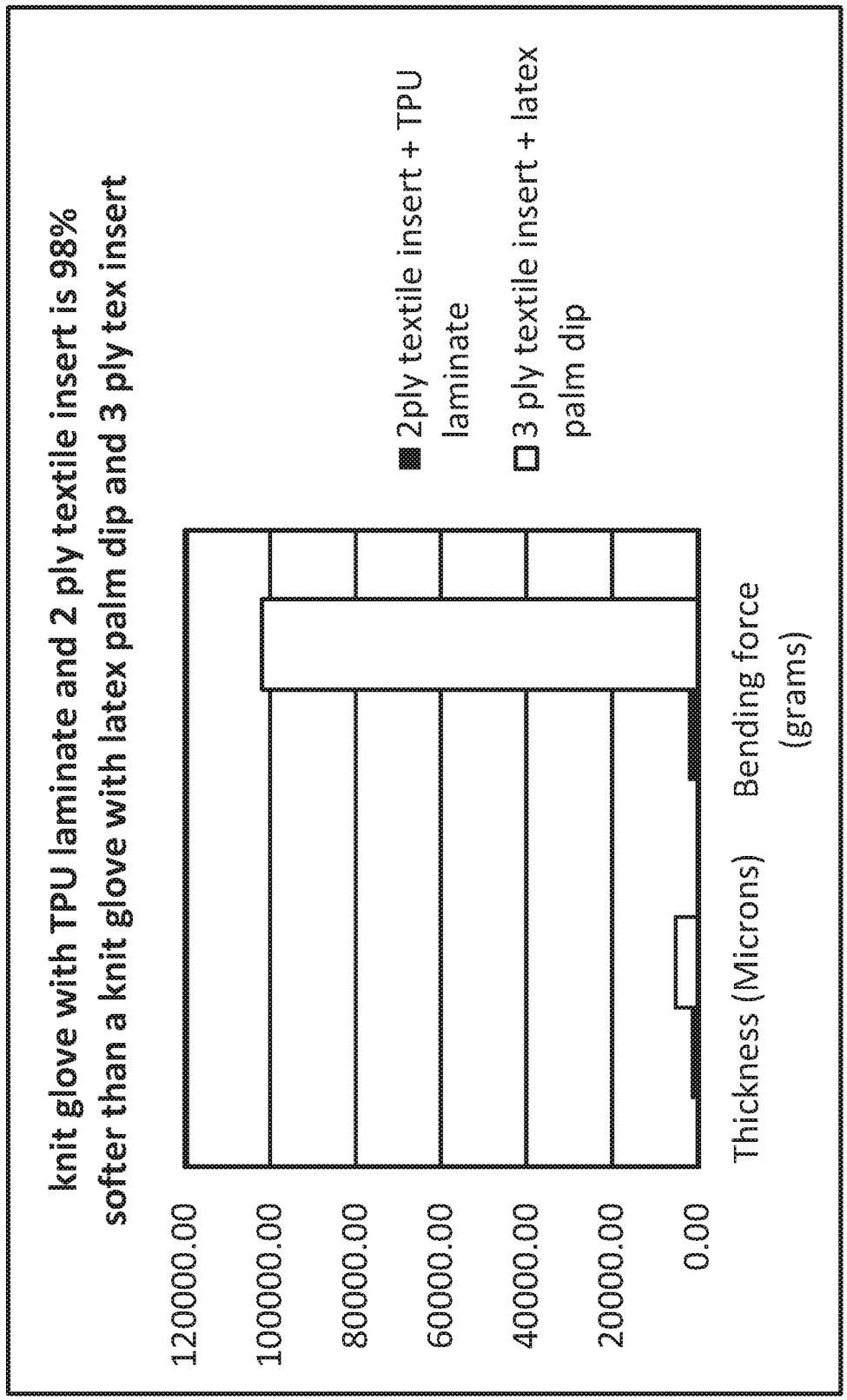
FIG. 11E is a bar graph showing that a knit glove with a TPU laminate preform applied to the palm and including a 2 ply textile insert is 98% softer than a knit glove with a latex palm dip and a 3-ply textile insert.

FIG. 11B presents a flexibility comparison using the circular bending test described above, showing that a knit glove with a TPU and textile laminate preform applied to the palm is 48% softer than a knit glove that has been palm-dipped with PVC only. FIG. 11C presents a similar flexibility comparison, showing that a knit glove with a para-aramid textile and urethane laminate preform applied to the palm is 54% softer than a para-aramid knit glove that has been palm dipped with only nitrile. FIG. 11D presents a similar flexibility comparison, showing that a knit glove with a TPU laminate preform and including a textile insert is 82% softer than a knit glove that has been nitrile dipped. And FIG. 11E presents a similar flexibility comparison, showing that a knit glove with a TPU laminate preform applied to the palm and including a 2 ply textile insert is 98% softer than a knit glove with a latex palm dip and a 3-ply textile insert.

EXAMPLES

Example 1: Knit shell with insert and laminate preform including grip and graphics layers
  Glove shell: 210 denier nylon 13 gauge knit shell
  Insert: 220 denier of construction 100×60 epi of PET fiber woven or 30 denier Nylon at 100×100 epi bonded inside the shell
  Laminate preform:
    Grip layer: polyether thermoplastic urethane ("TPU") of hardness 80 shore of 25 microns thickness
    CYK graphics layer: fusible inks of 5-12 microns thickness
    Adhesive Layer: polyether thermoplastic urethane adhesive layer, 25 micron thick, that bonds the graphics layer and grip layer to the glove shell at 350 degrees Fahrenheit
  Manufacturing Process: The adhesive layer is printed with the graphics layer, then the grip layer is laminated on top of the other two layers to complete the 3-ply laminate preform material. The 210 denier knit shell is mounted on the 3D laminating form. The laminate preform material is cut to shape and laminated to the glove shell on the 3D laminating form in a platen press at 35° F.

Example 2: Knit shell with TPU/grain-elastomer/30 denier nylon woven/PSA laminate preform
  Glove shell: 210 denier nylon 13 gauge knit shell
  Insert: 220 denier 100×60 epi of PET fiber woven or 30 denier nylon at 100×100 epi bonded inside the glove shell
  Laminate preform:
    Grip layer: Polyether thermoplastic urethane of hardness 85 shore of 25 microns thickness
    CYK graphics layer: fusible inks of 5-12 microns thickness
    Adhesive tie layer: Polyether thermoplastic urethane adhesive between 12 and 25 microns thick
    Mechanical layer: 30 denier woven nylon 100×100 epi
    Filler layer: SB rubber in solvent with 220+600 grit silicone carbide filler added in a 4.5:1 ratio to the elastomer by weight
    Adhesive: Rosinated SBR blend in a solvent-based pressure sensitive adhesive (PSA)
  Manufacturing process: The grip layer is printed with the graphics layer. Then the grip layer is laminated to the textile layer. The textile layer has TPU on the face side and the grain layer and PSA blade coated to the reverse side. This completes the 6 ply laminate preform material. The 210 denier knit shell is mounted on the 3D laminating form. The laminate preform material is cut to shape and laminated to the glove shell on the 3D laminating form in a platen press at 300 degrees Fahrenheit.

Example 3: Knit shell with non-thermoplastic PU/grain-elastomer-PSA laminate preform
  Glove shell: 210 denier nylon 13 gage knit shell
  Insert: 220 denier of construction 100×60 epi of PET fiber woven or 140 denier 80×70 para-aramid woven or 30d Nylon at 100×100 epi bonded inside the shell
  Laminate preform:
    Grip layer: Cast non-thermoplastic polyester urethane of hardness 95 shore of 25 microns thickness
    CYK graphics layer: fusible inks of 5-12 microns thickness
    Filler layer: SB rubber in solvent with 220+600 grit silicone carbide filler added at a 4.5:1 ratio to the elastomer by weight
    Adhesive: Rosinated SBR blend in solvent-based pressure sensitive adhesive (PSA)
  Manufacturing process: The grip layer is cast from a reactive mixture of polyol and isocyanate, cured, and then printed with the graphics layer. Then the grain layer and PSA layers are roll-coated to the glove shell side of the laminate preform. This completes the 4-ply laminate preform material. The 210 denier knit glove shell is mounted on the 3D laminating form. The laminate perform material is cut to shape and laminated to the glove shell on the 3D laminating form in a platen press at 300 Fahrenheit.

Example 4: Knit shell with neoprene/nylon/PSA laminated preform

Example 5: Knit shell over a glove with unbonded or semi bonded insert glove
  Glove shell: 210 denier nylon 13 gage knit shell
  Insert: Cut-and-sew liner of 200 denier×400 denier para-aramid of 110×65 epi of construction woven, bonded inside the glove shell
  Laminate preform:
    Grip layer: Polyester thermoplastic urethane of hardness 85 shore 25 microns thick
    CYK graphics layer: fusible inks of 5-12 microns thickness
    Adhesive tie layer: Polyester thermoplastic urethane adhesive 25 microns thick
  Manufacturing process: The grip layer is printed with the graphics layer, then the grip layer is laminated to the adhesive layer. This complete the 3-ply laminate preform. The 210 denier knit glove shell is mounted on the 3D laminating form. The laminate preform material is cut to shape and laminated in a platen press at 350 degrees Fahrenheit to the glove shell on the 3D laminating form. After removal from the 3D laminating form the glove shell is bonded to the sewn liner.

Example 6: Cut and sew shell with TPU/inkjet/TPU laminate preform
  Shell: 100 denier nylon 50 gage knit with 10% 70 denier lycra in a full fourchette cut-and-sew shell Insert: 220 denier of construction 100×60 epi of PET fiber woven or 30 denier Nylon at 100×100 epi, bonded inside the glove shell Laminate preform:
  Grip layer: Polyester thermoplastic urethane of hardness 85 shore 25 microns thick
  CYK graphics layer: fusible inks 5-12 microns thick
  Adhesive: Polyester thermoplastic urethane adhesive layer that bonds the graphics layer and grip layer to the glove shell at 350 degrees Fahrenheit
  Manufacturing Process: The adhesive layer is printed with the graphics layer, then the grip layer is laminated to the other two layers to complete the 3-ply laminate preform material. The 210 denier knit shell is mounted on the 3D laminating form. The laminate preform material is cut to shape and bonded to the glove shell on the 3D laminating form in a platen press at 350 degrees Fahrenheit.

Example 7: Vacuum or bladder press formed laminate preform,

Example 8: Double sided laminate preform on palm and back surfaces of the glove shell, with overlaps at the finger tips and the fourchettes (see FIG. 7)

Shell: 210 denier nylon 13 gage knit shell
Insert: Full cut and sew glove of a suitable fabric having a 220 denier construction 100×60 epi of PET fiber woven, or 30 denier Nylon at 100×100 epi, or 200 denier×400 denier 110×65 epi para-aramid bonded inside the glove shell Laminate preform:
  Grip layer: Polyester thermoplastic urethane of hardness 85 shore of 25 microns thickness
  CYK graphics layer: fusible inks of 5-12 microns thickness
  Adhesive layer: Polyester thermoplastic urethane adhesive layer that bonds the graphics layer and grip layer to the glove shell at 350 degrees Fahrenheit
  Manufacturing process: The adhesive layer is printed with the graphics layer, then the grip layer is laminated to the other two layers to complete the 3-ply laminate preform material. The 210 denier knit shell is mounted on the 3D laminating form. The laminate preform material is cut to shape and laminated to the glove shell on the 3D laminating form in a platen press at 350 degrees Fahrenheit. Then the assembled knit shell and laminate preform are bonded to the cut-and-sew insert glove.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method of manufacturing a glove having a three-dimensional shape that closely approximates the shape of a human hand, the glove including a solid laminate preform attached by a lamination adhesive to a lamination region of an underlying glove shell, the method comprising:
  providing a textile glove shell having a lamination region extending onto at least one of a palm, back, and finger region of the glove shell;
  preparing a flexible solid laminate preform, the laminate preform including an exposed layer of lamination adhesive;
  providing a laminating form having a smooth, flat laminating surface;
  placing the glove shell onto the laminating form so that the glove shell surrounds the laminating form, and so that the lamination region of the glove shell conforms closely to the smooth, flat laminating surface; placing the laminate preform on the glove shell lamination region above the laminating surface, the exposed layer of lamination adhesive being in direct contact with the glove shell;
  applying a pressure above ambient pressure at a temperature above ambient temperature to the assembled laminate preform, glove shell, and laminating form, thereby causing the lamination adhesive to bond the laminate preform to the lamination region of the glove shell; and
  removing the glove shell with the laminate preform bonded thereto from the laminating form, whereby the glove shell after removal from the laminating form assumes a shape that closely approximates the shape of a human hand.

2. The method of claim 1, wherein the glove shell is a seamless 3D glove shell.

3. The method of claim 1, wherein the laminating form includes a pair of opposing surfaces that are overlapping, substantially flat, and substantially parallel to each other, the laminating surface being included in one of the opposing surfaces.

4. The method of claim 3, wherein applying pressure to the assembled laminate preform, glove shell, and laminating form includes applying pressure using at least one of a platen press, a roll press, a belt press, and a nip roll press.

5. The method of claim 1, wherein:
  the glove shell is reversibly deformable;
  placing the glove shell on the laminating form includes deforming the glove shell; and
  removing the glove shell with the laminate preform bonded thereto from the laminating form includes allowing the glove shell with laminate preform bonded thereto to recover substantially to the shape of a human hand.

6. The method of claim 5, wherein placing the glove shell on the laminating form includes increasing a circumference of a glove shell finger portion by a factor of between 10% and 60%.

7. The method of claim 5, wherein a finger portion of the laminating form is wider and thinner in shape than a corresponding finger portion of the glove shell, thereby increasing a region of bonding of the laminate preform to the corresponding finger portion of the glove shell, and causing a warping deformation of the laminate preform about the corresponding finger portion of the glove shell due to the shape recovery of the glove shell after it is removed from the laminating form.

8. The method of claim 5, wherein a finger portion of the laminating form is narrower and thicker in shape than a corresponding finger portion of the glove shell, thereby limiting a region of bonding of the laminate preform to the corresponding finger portion of the glove shell, and minimizing interference of the laminate preform with the recovery of the glove shell shape upon removal of the glove shell from the laminating form.

9. The method of claim 1, wherein the glove shell textile has a total surface energy of greater than 40 mJ/m$^2$.

10. The method of claim 1, further comprising, before placing the laminate preform on the glove shell, removing substantially all spin finish and lubricants from the glove shell textile in the lamination region of the glove shell, such that a Soxhlet extraction with acetone yields less than 1.5% by weight of the glove shell textile.

11. The method of claim 1, further comprising, before placing the laminate preform on the glove shell, removing substantially all spin finish and lubricants from the glove shell textile in the lamination region of the glove shell, such that a Soxhlet extraction with acetone yields less than 0.5% by weight of the glove shell textile.

12. The method of claim 1, wherein the laminate preform includes at least one of:
   a textile layer;
   an oriented film; and
   a layer of graphics.

13. The method of claim 1, wherein preparing the laminate preform includes at least one of printing, roll-to-roll coating, extrusion, stenting, blown extrusion, weaving, and knitting.

14. The method of claim 1, wherein the layer of lamination adhesive is an adhesive film layer having a thickness of between 6 and 50 microns.

15. The method of claim 1, wherein the layer of lamination adhesive is an adhesive film layer, and the method further comprises controlling the thicknesses of the adhesive film layer to within less than +/−5 microns.

16. The method of claim 1, wherein the layer of lamination adhesive has a surface energy that is greater than 30 mJ/m$^2$.

17. The method of claim 1, wherein the laminate preform includes an exposed upper layer, whereby the upper layer and the lamination adhesive layer extend beyond any intervening layers, so that the perimeter of the upper layer is bonded by the lamination adhesive layer directly to the glove shell.

18. The method of claim 1, wherein the pressure above ambient pressure is between 5 psi and 150 psi above ambient pressure.

19. The method of claim 1, wherein the temperature above ambient temperature is between 200 degrees Fahrenheit and 375 degrees Fahrenheit.

20. The method of claim 1, further comprising:
   preparing a flat, solid inner laminate preform, the inner laminate preform including an exposed layer of inner lamination adhesive;
   placing the inner laminate preform on the laminating surface of the laminating form before placing the glove shell thereupon, so that the inner lamination adhesive is in direct contact with an inner surface of the glove shell; and wherein applying pressure to the assembled laminate preform, glove shell, inner laminate preform, and laminating form causes the inner lamination adhesive to bond the inner laminate preform to the inner surface of the glove shell.

21. The method of claim 1, further comprising attaching a cut-and-sew inner liner inside of the glove shell before placing the inner lining and glove shell onto the laminating form.

22. The method of claim 1, wherein the method includes providing and bonding only one solid laminate preform, in total, to the glove.

* * * * *